United States Patent [19]

May et al.

[11] Patent Number: 4,783,734

[45] Date of Patent: Nov. 8, 1988

[54] COMPUTER SYSTEM WITH VARIABLE LENGTH PROCESS TO PROCESS COMMUNICATION

[75] Inventors: Michael D. May; Roger M. Shepherd, both of Bristol, United Kingdom

[73] Assignee: INMOS Limited, Bristol, England

[21] Appl. No.: 756,431

[22] PCT Filed: Nov. 2, 1984

[86] PCT No.: PCT/GB84/00378

§ 371 Date: Jul. 3, 1985

§ 102(e) Date: Jul. 3, 1985

[87] PCT Pub. No.: WO85/02038

PCT Pub. Date: May 9, 1985

[30] Foreign Application Priority Data

Nov. 4, 1983 [GB] United Kingdom ............. 8329509

[51] Int. Cl.⁴ ............................................. G06F 15/16
[52] U.S. Cl. ................................................... 364/200
[58] Field of Search ... 364/200 MS File, 900 MS File

[56] References Cited

U.S. PATENT DOCUMENTS 4,060,849 11/1977 Bienvenu et al. .............. 364/200
4,075,691 2/1978 Davis et al. ..................... 364/200
4,084,228 4/1978 Dufond et al. .................. 364/200

*Primary Examiner*—David Y. Eng
*Attorney, Agent, or Firm*—Edward D. Manzo

[57] ABSTRACT

A microcomputer method and system for executing a plurality of concurrent processes provides synchronized message transmission so that data is transmitted between a communicating pair of processes when the two processes are at corresponding program stages. The messages may be variable in length and are transmitted by indicating a source address for the data to be transmitted, a destination address for the data, and a count of the number of standard unit lengths of data to be transmitted in the message.

20 Claims, 23 Drawing Sheets

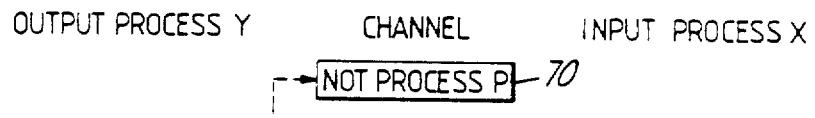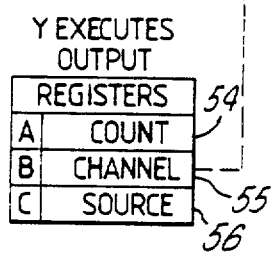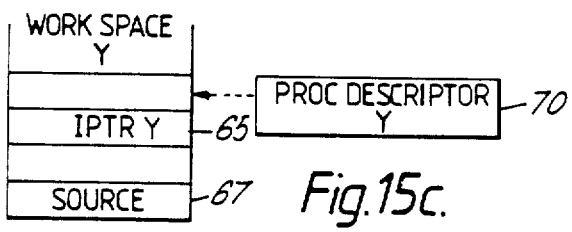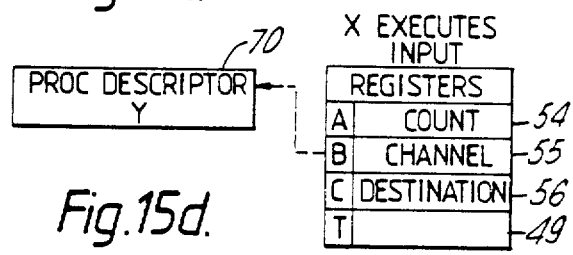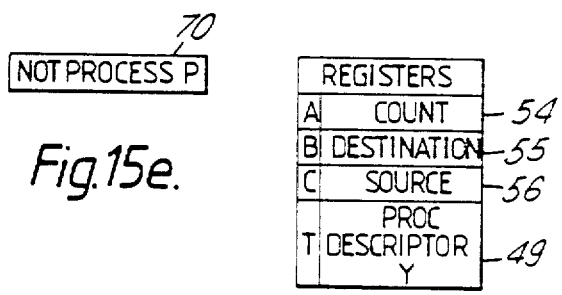

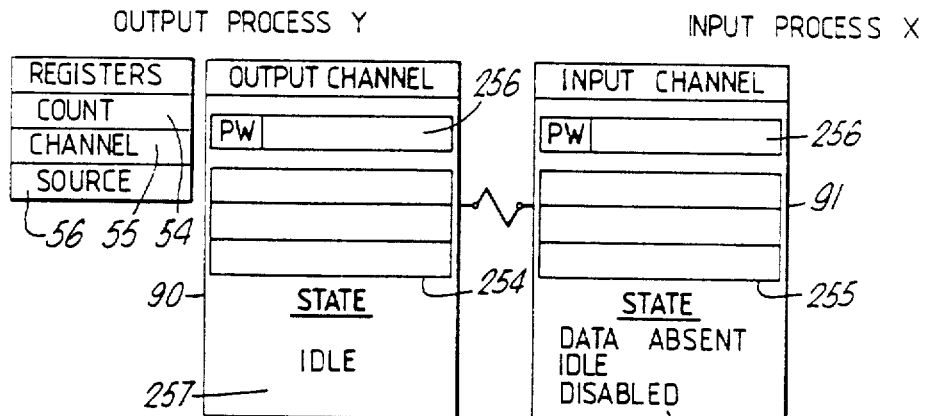
Fig. 16.a.
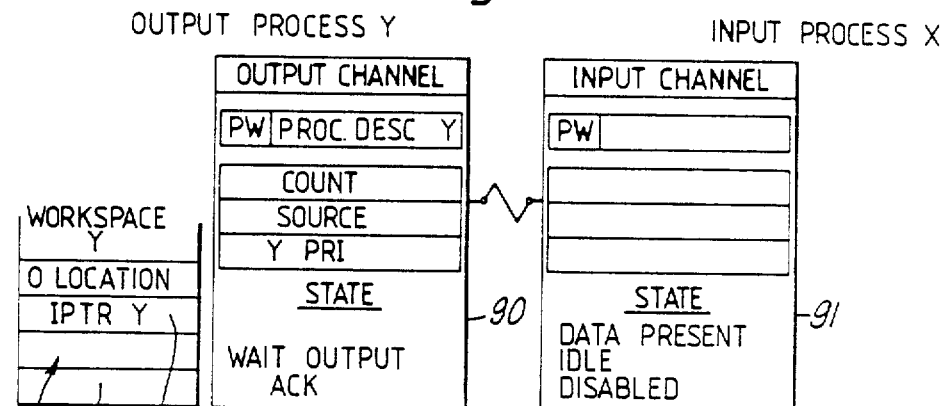
Fig. 16.b.
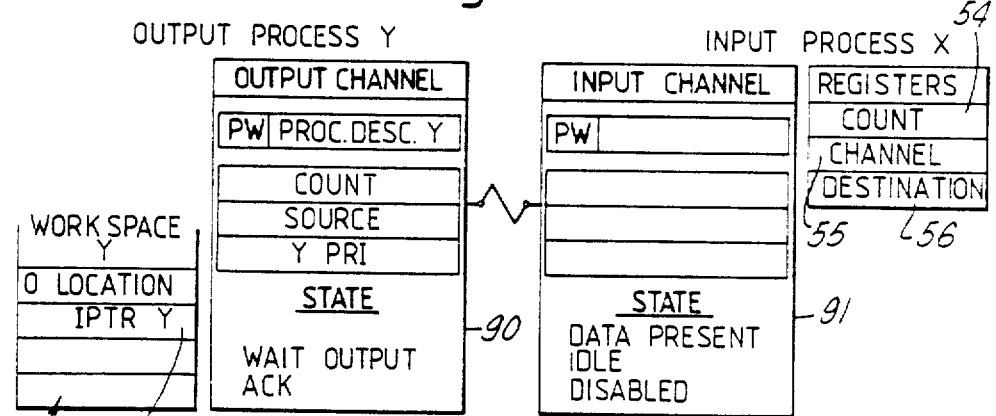
Fig. 16.c.

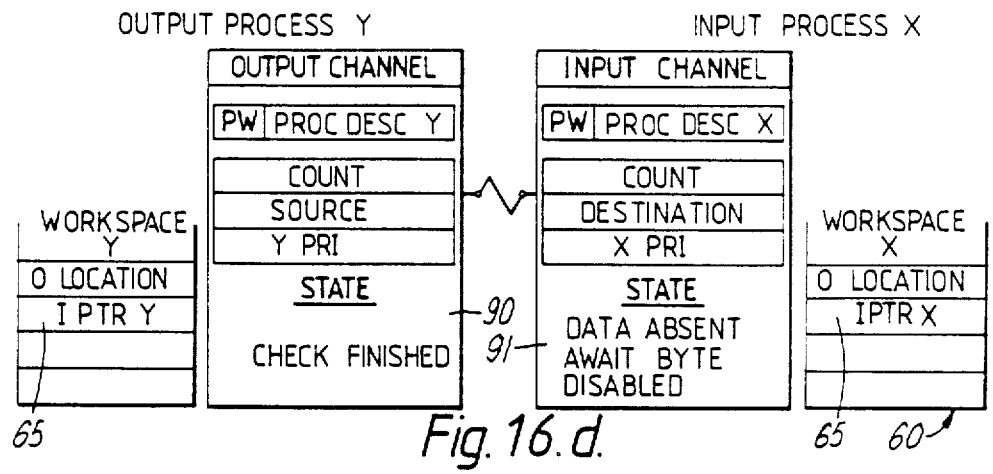
Fig. 16.d.
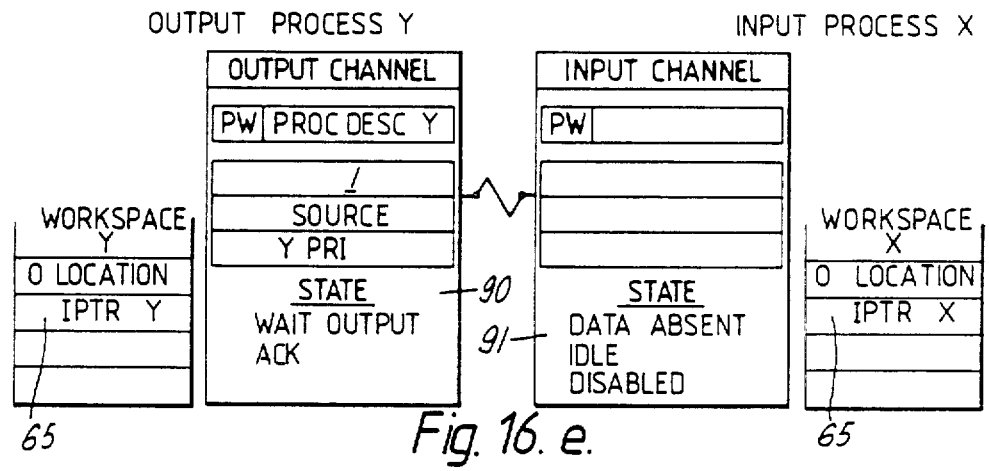
Fig. 16.e.
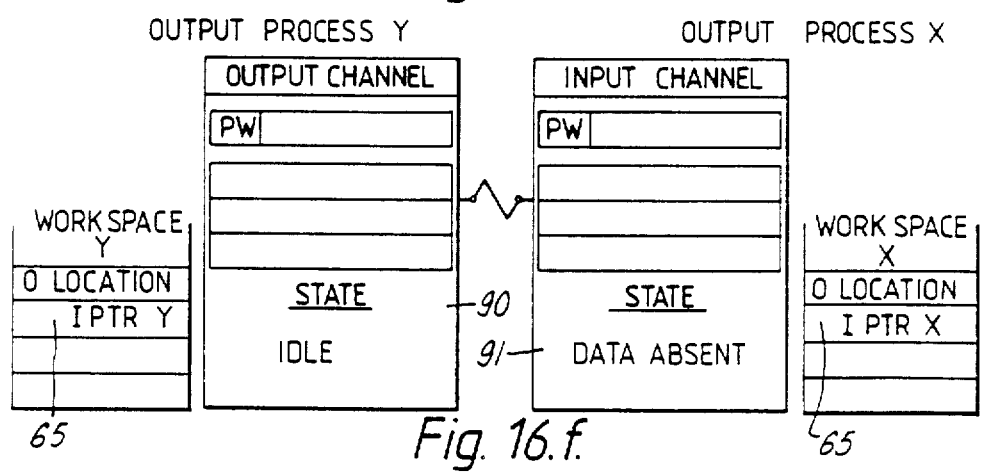
Fig. 16.f.

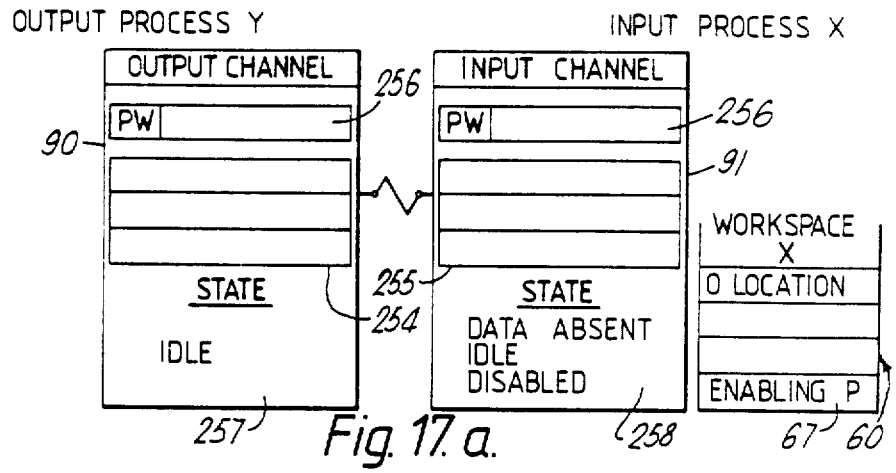
Fig. 17.a.
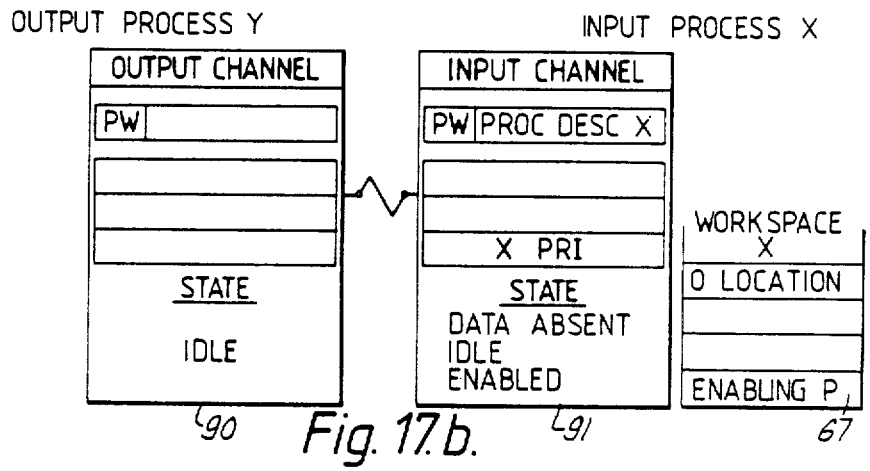
Fig. 17.b.
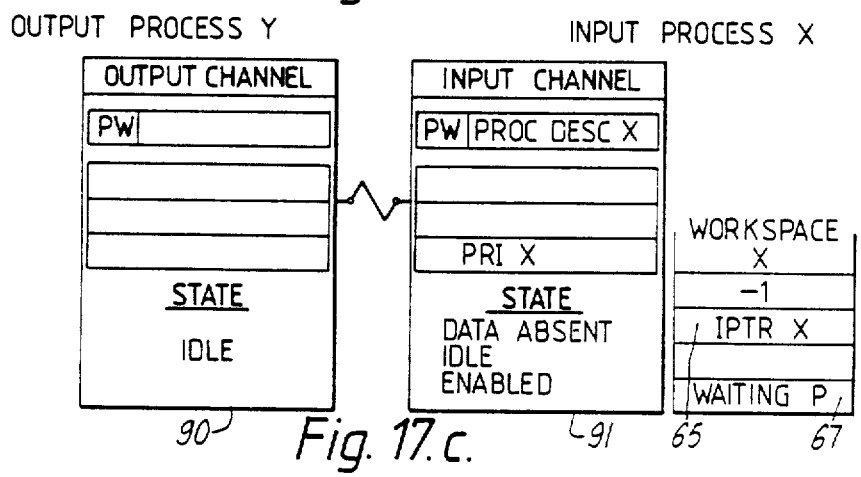
Fig. 17.c.

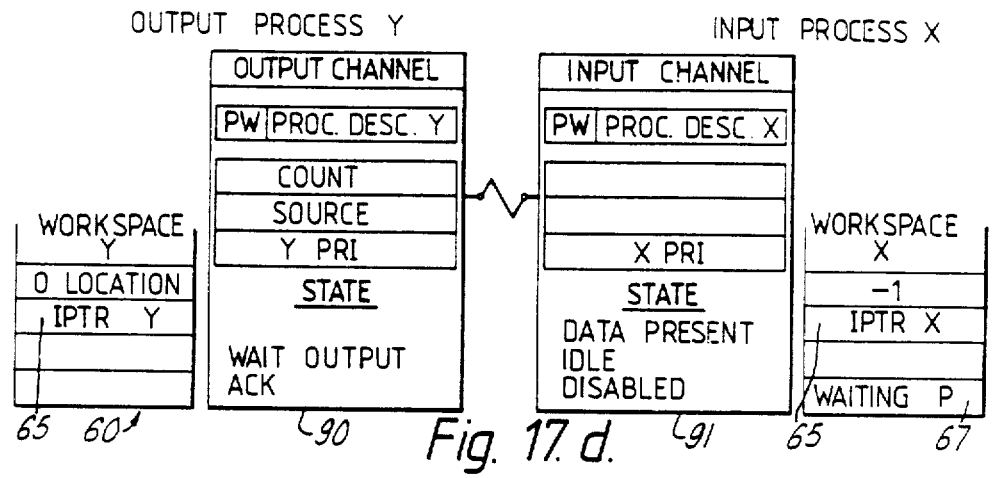
Fig. 17.d.
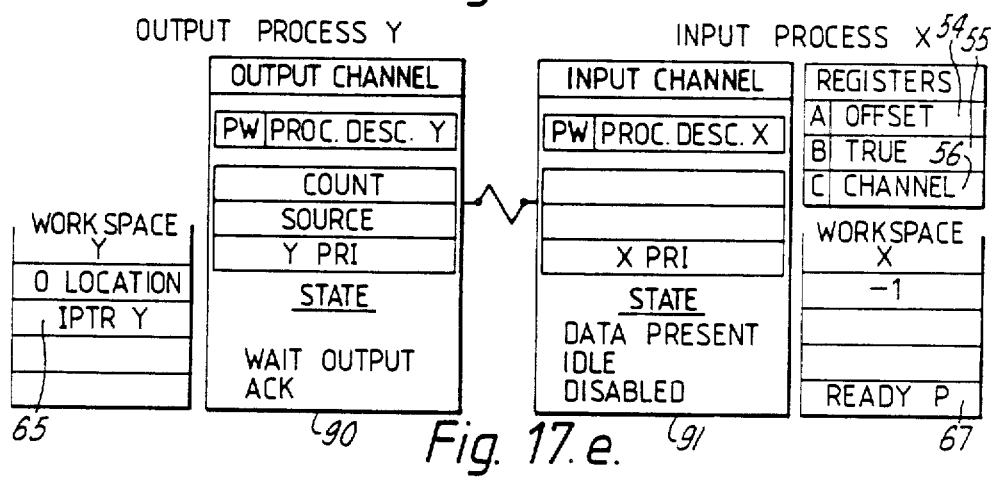
Fig. 17.e.
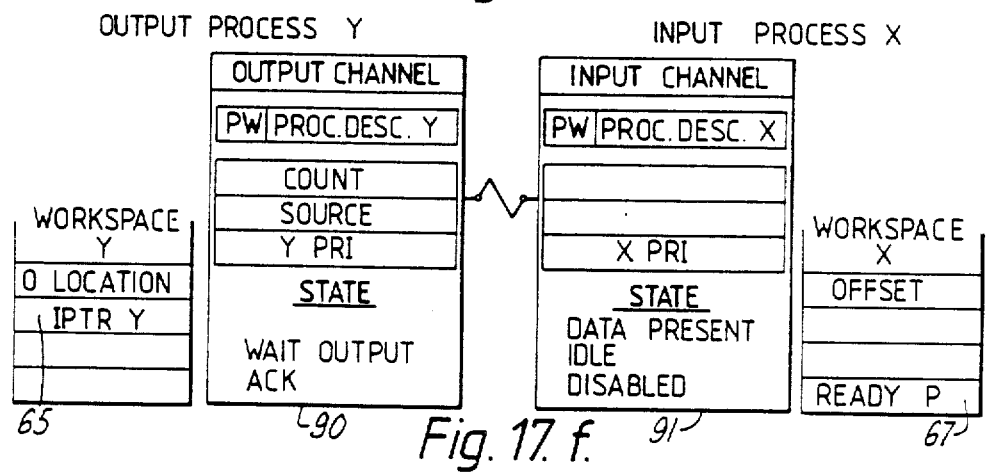
Fig. 17.f.

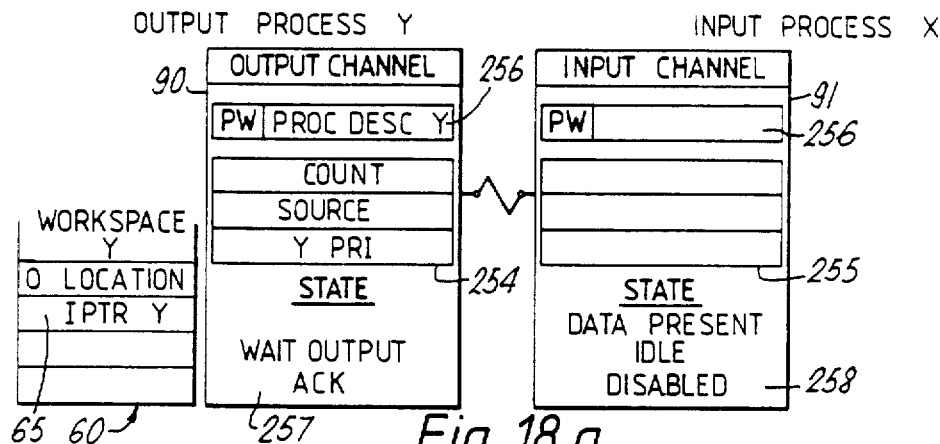
Fig. 18.a.
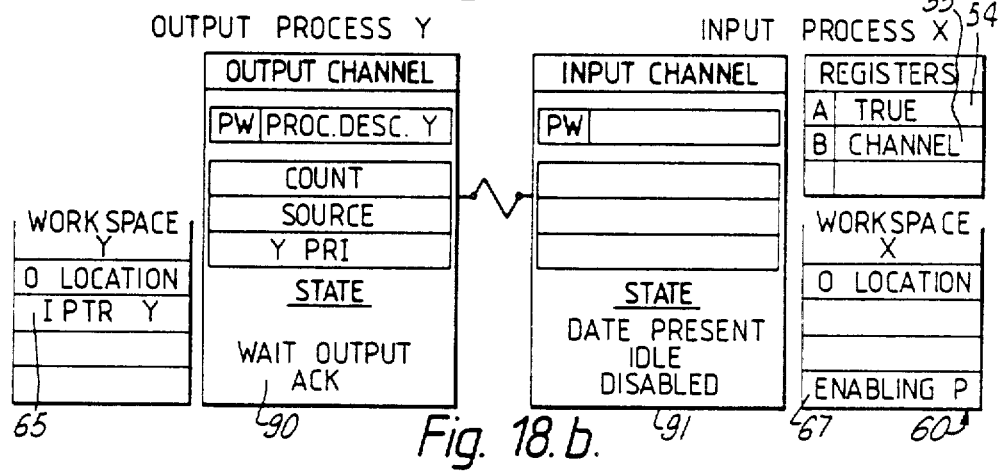
Fig. 18.b.
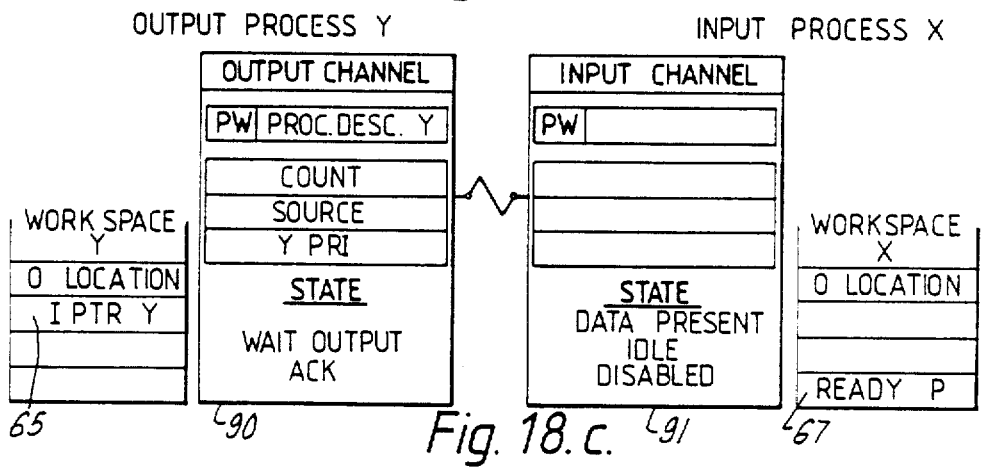
Fig. 18.c.

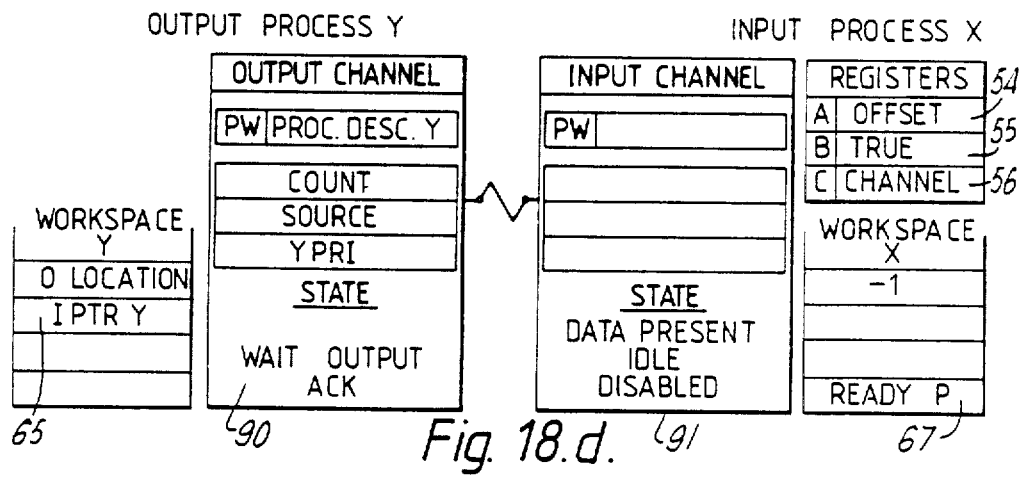
Fig. 18.d.

OUTPUT PROCESS Y          INPUT PROCESS X

OUTPUT PROCESS Y          INPUT PROCESS X

OUTPUT PROCESS Y          INPUT PROCESS X

OUTPUT PROCESS Y          INPUT PROCESS X

COMPUTER SYSTEM WITH VARIABLE LENGTH PROCESS TO PROCESS COMMUNICATION

The invention relates to microcomputers and particularly to microcomputers arranged to permit data transmission between processes.

BACKGROUND OF THE INVENTION

The present invention is a development of the microcomputer described in our European patent specification No. 0113516. That specification describes the microcomputer with a memory and processor arranged to execute a plurality of concurrent processes and to provide synchronised communication between concurrent processes on the same microcomputer or interconnected microcomputers. However, the device described in that specification was arranged to transmit messages which were each of one word length. After execution of each message instruction one word is transmitted and subsequent message instructions are required in order to cause further words to be transmitted. In the case of a 16 bit machine each message would be of 16 data bits.

OBJECTS OF THE PRESENT INVENTION

It is an object of the present invention to provide an improved microcomputer which permits variable length message transmission.

It is a further object of the present invention to provide an improved microcomputer which may transmit messages in multiples of standard bit length units.

It is a further object of the present invention to provide a microcomputer which may communicate in a network with other devices of different wordlength.

SUMMARY OF THE INVENTION

The invention provides a microcomputer comprising memory and a processor arranged to execute a plurality of concurrent processes, each in accordance with a program consisting of a plurality of instructions for sequential execution by the processor, each instruction designating a required function to be executed by the processor, said processor comprising (1) a plurality of registers and data transfer means for use in data transfers to and from said registers (2) means for receiving each instruction and loading into one of the processor registers a value associated with the instruction, and (3) control means for controlling said data transfer means and registers in response to each instruction received to cause the processor to operate in accordance with the instruction, wherein the microcomputer includes:
 (a) scheduling means to enable the processor to share its processing time between a plurality of concurrent processes, said scheduling means comprising:
  (i) means for identifying one or more processes to form at least one collection awaiting execution by the processor
  (ii) means for descheduling a process by interrupting execution of the current process
  (iii) means for scheduling a process by adding it to a collection awaiting execution, and
 (b) communication means to permit message transmission from one process to another by use of one or more communication channels when both processes are at corresponding stages in their program sequences, an outputting process operating to output data and an inputting process operating to input data in response to message instructions, said communication means including:
  (i) means for transferring from one addressable location to another a message unit of predetermined bit length
  (ii) means responsive to execution of a message instruction to provide a count of the number of mesaage units to be included in a message.
  (iii) source indicator means responsive to execution of a message instruction by an outputting process to indicate the address from which data is to be output, and
  (iv) destination indicator means responsive to execution of a message instruction by an inputting process to indicate the address to which the data is to be input.

Preferably said predetermined bit length of each message unit is one byte. Preferably the microcomputer includes means for counting the number of bytes transmitted in a message to or from a process and providing a signal when all bytes in the message have been transmitted.

Preferably, means are provided to alter the address indicated by the source indicator means as the count of the number of bytes remaining to be transmitted decreases.

Preferably, means is provided to change the address indicated by the destination indicator means as the count of the number of bytes remaining to be transmitted changes.

Preferably, the communication means is arranged to permit data transmission between processes which are executed on the same microcomputer and said channel comprising a memory location.

Preferably, the processor has means for copying directly a number of bytes of data indicated as a result of execution of a message instruction, directly from one byte address to another in the memory of the microcomputer.

Preferably, the communication means is arranged to permit external data transmission between processes which are executed on different microcomputers and the or each channel comprises an external communication link.

Preferably, each external communication link comprises store means for holding one byte of data.

Preferably, each external communication link is arranged to deschedule a process which executes a message instruction using the address of that link and each link includes means for storing an indication of the number of bytes to be transmitted through the link together with a pointer to the source or destination address for the next byte of the message.

Preferably, each external communication link includes means for counting the number of bytes transmitted and providing an indication when all bytes have been transmitted.

Preferably, each external communication link includes signal generating means to generate a request signal to the processor to reschedule the process involved in the message transmission when all bytes of the message have been transmitted.

It will be understood that the term microcomputer relates to small size computers generally based on integrated circuit devices but it does not impose any limit on how small the computer may be.

BRIEF DESCRIPTION OF THE DRAWINGS

An embodiment of the invention will now be described by way of example and with reference to the accompanying drawings in which:

FIG. 15 illustrates in a sequence from 15(a) to 15(e) operations for effecting communication between two processes on one microcomputer, FIG. 16 illustrates in a sequence from 16(a) to 16(f) operations for effecting communication via serial links between two processes of similar priority carried out on different microcomputers, FIG. 17 illustrates in a sequence from 17(a) to 17(f) operations for effecting communication via serial links between two processes on different microcomputers in which the inputting process starts an "alternative input" before the outputting process starts to output, FIG. 18 illustrates in a sequence from 18(a) to 18(d) operations for effecting communication via serial links between two processes carried out on different microcomputers in which an outputting process first starts an output operation and this is followed by an inputting process executing an "alternative input" operation.

DESCRIPTION OF THE PREFERRED EMBODIMENT

Figure 1:
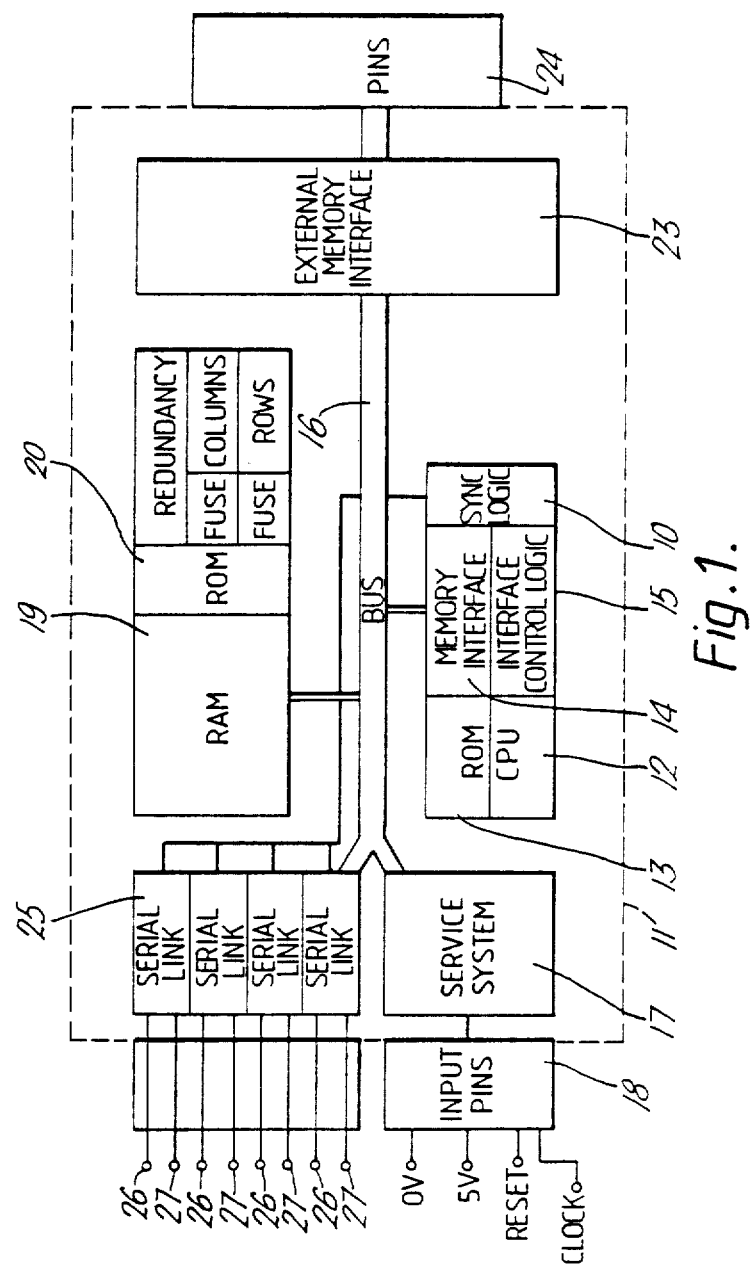
FIG. 1 is a block diagram showing the main features of the microcomputer.
Figure 22:
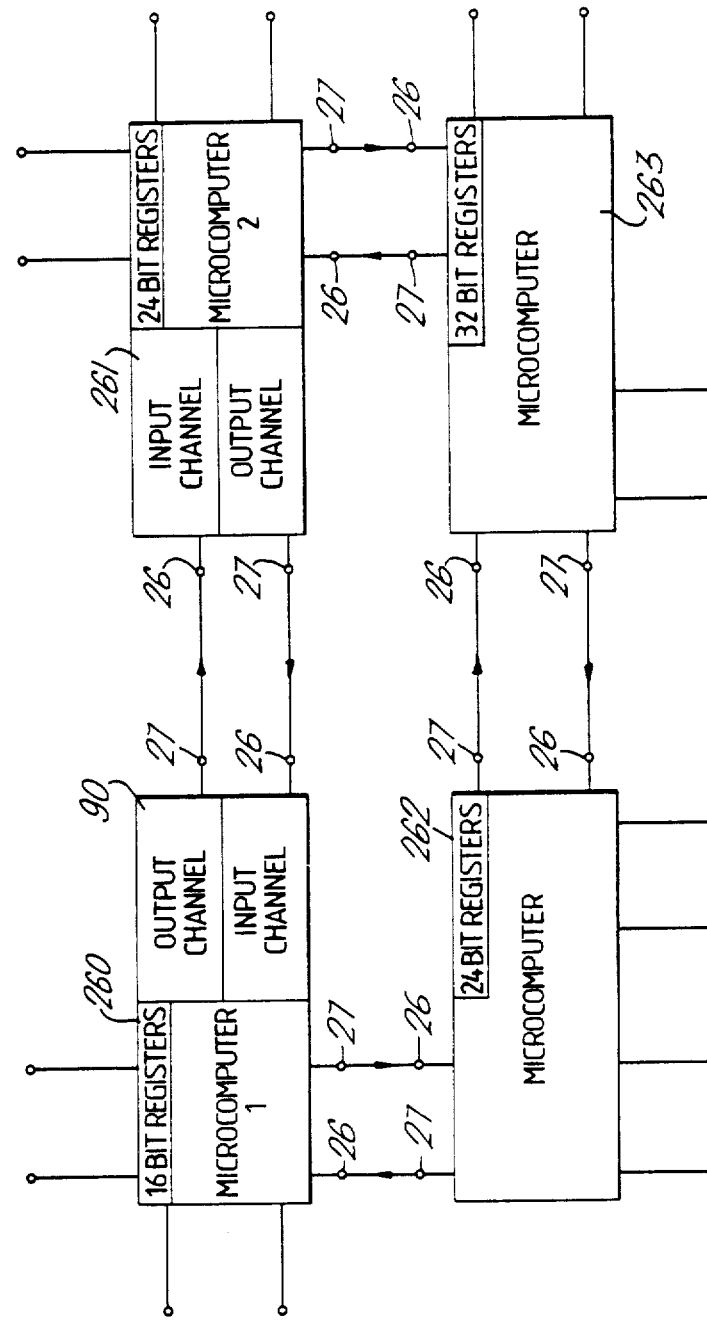
FIG. 22 illustrates a network of communicating microcomputers in accordance with the present invention, the microcomputers in the network having different wordlengths.

The microcomputer described in this example comprises an integrated circuit device in the form of a single silicon chip having both a processor and memory in the form of RAM as well as links to permit external communication. The main elements of the microcomputer are illustrated in FIG. 1 on a single silicon chip 11 using p-well complementary MOS technology. A central processing unit (CPU) 12 is provided with some read-only memory (ROM) 13 and is coupled to a memory interface 14 controlled by interface control logic 15. The CPU 12 incorporates an arithmetic logic unit (ALU), registers and data paths illustrated more fully in FIG. 2. The CPU 12 and memory interface 14 are connected to a bus 16 which provides interconnection between the elements on the chip 11. A service system 17 is provided with a plurality of input pins 18. The microcomputer is provided with a random access memory (RAM) 19 and ROM 20 and the amount of memory on the chip is not less than 1K byte so that the processor 12 can be operated without external memory. Preferably the memory on the chip is at least 4K bytes. An external memory interface 23 is provided and connected to a plurality of pins 24 for connection to an optional external memory. To allow the microcomputer to be linked to other computers to form a network, a plurality of serial links 25 are provided having input and output pins 26 and 27 respectively. The input and output pins of one serial link may each be connected by its own single wire non-shared unidirectional connection to the corresponding output and input pins of a serial link on another microcomputer as shown in FIG. 22. Each serial link is connected to a synchronisation logic unit 10 comprising process scheduling logic.

The block diagram shown in FIG. 1 corresponds to that included in European patent application No. 83307078.2, Japanese patent application No. 221455/1983 and U.S. patent application Ser. Nos. 552601, 552602, 553027, 553028 and 553029. To avoid unnecessary repetition of description, the full details of the construction and operation of that microcomputer will not be set out below but the description in the above mentioned patent applications is hereby incorporated herein by reference.

The present embodiment provides an improved form of Transputer (Trade Mark of INMOS International plc) microcomputer. In the particular embodiment described in the above mentioned patent applications, all processes were treated as having equal priority. Messages communicated between one process and another had a uniform message length between successive synchronising operations and in the example described the message length was one word. If a process was required to input from one of a number of alternative input channels it was necessary for the process to remain scheduled in order to test those channels until an outputting process commenced an output operation of one of the possible channels.

The present embodiment is an improvement in that it permits different priority allocation to different processes. It permits variable length message communication between processes, each message consisting of one or more units of standard bit length such as a byte. Furthermore it permits an inputting process to input from one of a number of alternative input channels without the need to remain scheduled while awaiting an outputting process.

The overall arrangement of the microcomputer is generally similar to that described in the above mentioned patent applications. In the following description similar names will be given to those parts corresponding to the embodiment in the above mentioned patent applications. The memory provides a plurality of process workspaces having addressable locations which can be indicated by pointers. Message communication can be effected through an addressable memory location (herein called a soft channel) in the case of process to process communication on the same microcomputer. To effect process to process communication between different microcomputers input and output channels (herein called hard channels) are provided in serial links and these channels may also be addressed in a manner similar to the soft channels provided in the memory.

In order to implement the improvements discussed above, various modifications in the construction and operation of the microcomputer are necessary and the following description will be directed to those aspects where modifications are involved in order to effect those improvements.

As in the example of the above mentioned patent applications, the particular wordlength of the example described is 16 bits but it will be understood that other wordlengths such as 8, 16, 24, 32 or other wordlengths may be used. Furthermore, in the present case different wordlength microcomputers can be connected in the same network so that they may communicate with each other regardless of their independent wordlength.

Figure 5:
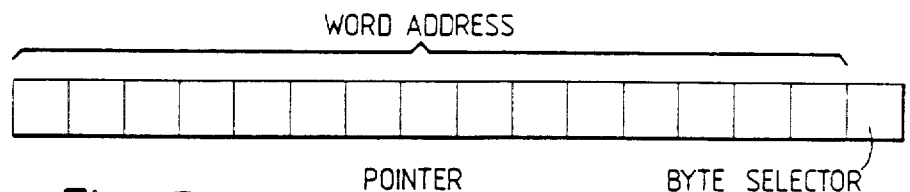
FIG. 5 illustrates a form of pointer used in the microcomputer.

In this example message communication on the same microcomputer or between different microcomputers is effected by transmitting one or more message units of standard bit length and in this example each message unit consists of 8 bits thereby forming 1 byte. This means that it is necessary to be able to identify a byte in memory. The processor accesses the memory in words and all byte operations are performed by the processor. As shown in FIG. 5, a pointer is a single word of data (in this particular example 16 bits). The least significant bit acts as a byte selector and the most significant 15 bits provide a word address. The number of bits needed to represent the byte selector depends on the word length of the microcomputer. In the case of a 16 bit machine, only 1 bit is needed as a byte selector. It will however be understood that the byte selector will need two bits for a 24 or 32 bit microcomputer and 4 bits for an 80 bit microcomputer. Where a pointer is used to identify a word rather than a byte, a pointer to the least significant byte in that word is used.

The pointer is treated as a two's complement signed value. That means that if the most significant bit in the pointer is a 1 the most signficant bit is taken as negative with all the remaining bits representing positive numbers. If the most significant bit is 0 then all bits in the pointer are taken as representing positive values. This enables the standard comparison functions to be used on pointer values in the same way that they are used on numerical values.

Certain values are never used as pointers as they are reserved to indicate that some special action is required particularly relating to the state of the communication channels.

In the following description, names are used to represent these and other values as follows:
MostNeg: the most negative value (the most significant bit is one, and all other bits are zero)
MostPos: the most positive value (the most significant bit is zero, and all other bits are one)
MachineTRUE: 1
MachineFALSE: 0
NotProcess.p: MostNeg
Enabling.p: MostNeg+1
Waiting.p: MostNeg+2
Ready.p: MostNeg+3

Figure 6:
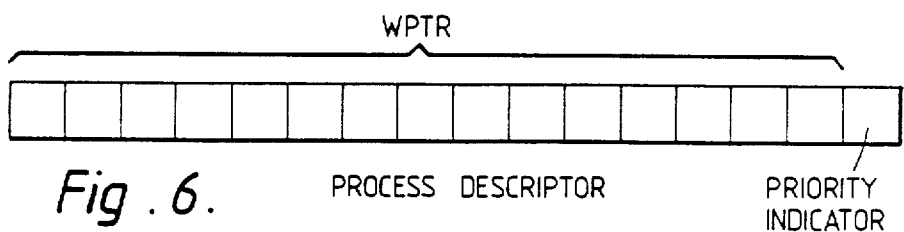
FIG. 6 illustrates a form of process descriptor used in the microcomputer.

As in the example of the above mentioned patent applications, each process may have a workspace consisting of a vector of words in memory used to hold the local variables and temporary values manipulated by the process. A workspace pointer WPTR is used to point to a set location for the process workspace. As the workspace of each process consists of a number of words, it is not necessary to incorporate the byte selector. It is therefore possible to use the byte selector bits to represent the priority of the process. In this way each process can be identified by a "process descriptor" of the type shown in FIG. 6. The least significant bit indicates the priority of the process and the most significant 15 bits indicate the word in memory identifying the process workspace. In the present example the microcomputer allocates one of two possible priorities to each process. A high priority process is given the designation Pri=0 and a low priority process has a designation Pri=1. It can therefore be seen that each process descriptor comprises a single word which is formed by taking the "bitwise OR" of the workspace pointer WPTR and the process priority Pri. Similarly the workspace point WPTR can be obtained from a process descriptor by forming the "bitwise AND" of the process descriptor and NOT 1. The priority of the process can be obtained by forming the "bitwise AND" of the process descriptor and 1.

CPU Data Paths and Registers

Figure 2:
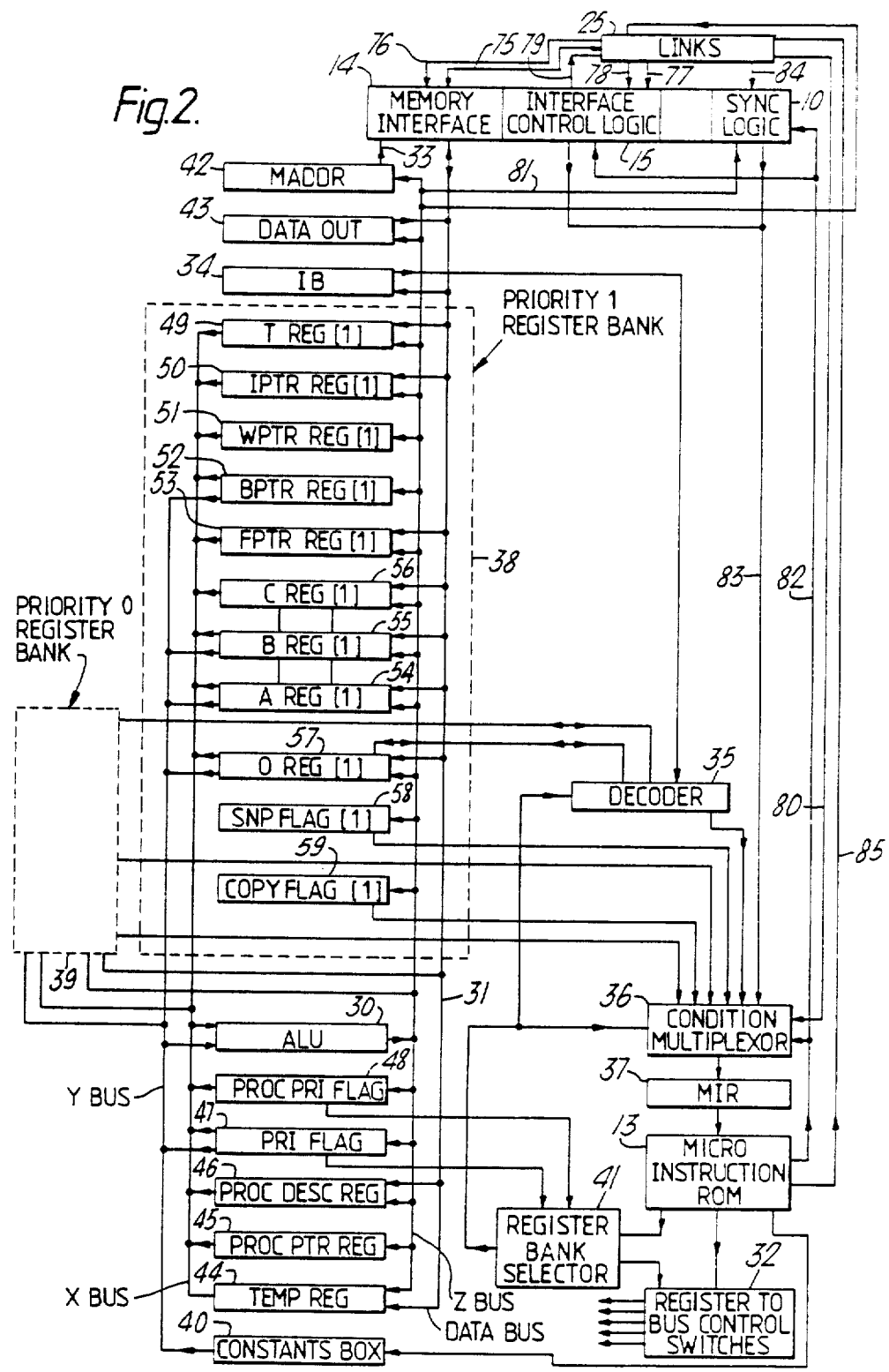
FIG. 2 shows further detail in block diagram form of part of the microcomputer and particularly illustrates the registers, data paths and arithmetic logic unit of the central processing unit as well as the interface between the central processing unit and the memory and communication links.

The central processing unit 12 and its operation will be more fully understood with reference to FIG. 2.

The CPU 12 includes an arithmetic logic unit (ALU) 30 and a plurality of data registers connected to an X bus, Y bus, Z bus and bidirectional data bus 31. The operation of the registers and their interconnections with the buses is controlled by a plurality of switches diagrammatically represented at 32 and controlled by signals derived from a microinstruction program contained in the ROM 13. Communication between the CPU and the memory is effected via a unidirectional address path 33 leading to the memory interface 14 as well as the data bus 31.

Figure 7:
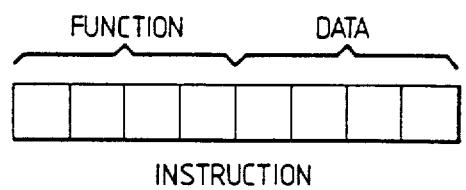
FIG. 7 illustrates a form of instruction used in the microcomputer.

As in the above mentioned patent applications, each instruction consists of 8 bits having the format shown in FIG. 7. 4 bits represent the required function of the instruction and 4 bits are allocated for data. Each instruction derived from the program sequence for the process is fed to an instruction buffer 34 and the instruction is decoded by a decoder 35. The output of the decoder is fed through a condition multiplexor 36 to a microinstruction register 37 used for addressing the microinstruction ROM 13. The operation of the instruction buffer 34, decoder 35, condition multiplexor 36, MIR 37, microinstruction ROM 13 and switches 32 are generally as described in the above mentioned patent applications.

As the present embodiment is arranged to deal with two sets of processes, those with priority 0 and those with priority 1, two register banks are provided. Register bank 38 is provided for the priority 1 processes and a similar register bank 39 is provided for the high priority 0 processes. Both register banks have a similar set of registers similarly connected to the X, Y, Z and data buses. For simplicity, the registers and their connections have only been shown in detail for register bank 38. In addition to the two register banks allocated to specific priorities, the CPU includes a constants box 40, a register bank selector 41 and a number of other registers indicated in FIG. 2 which are common to both priority 0 and priority 1 processes. The registers are as follows:

| Abbreviation | Register |
| --- | --- |
| | Common to both priority processes |
| MADDR | Memory address register 42 containing the address of the memory location required. |
| DATAOUT | A register 43 for supplying data to the memory on the data bus 31. |
| IB | Instruction buffer 34 for receiving sequentially instructions from the memory. |
| TEMP REG | A temporary register 44. |
| PROCPTR REG | A register 45 for holding a process pointer (no priority indication). |
| PROCDESC REG | A register 46 for containing a process descriptor |
| PRIFLAG | A 1 bit register or flag 47 for indicating the priority 0 or 1 of the currently executing process. If the processor is not executing a process this is set to 1. |
| PROCPRIFLAG | A 1 bit register or flag 48 for indicating a process priority. |
| | Registers in Bank 38 for Priority 1 |
| TREG | A temporary register 49. |
| IPTR REG | A register 50 which holds the instruction pointer (IPTR) of any process indicated by register 51 |
| WPTR REG | A register 51 for holding the workspace pointer (WPTR) of the current process or an interrupted process. |
| BPTR REG | A register 52 holding the workspace pointer of a process at the end of a list of priority 1 processes awaiting execution. |
| FPTR REG | A register 53 holding the workspace pointer of a process at the front of a list of priority 1 processes awaiting execution. |
| AREG | A first register 54 for holding an operand for the ALU 30 and arranged as a stack with registers 55 and 56. |
| BREG | A second register 55 forming part of the stack. |
| CREG | A register 56 forming a third register in the stack. |
| OREG | An operand register 57 for receiving the data derived from an instruction in the instruction buffer 34, and used as a temporary register. |
| SNPFLAG | A 1 bit register or flag 58 which when set to 1 indicates that the current process should be descheduled on completion of the current instruction. |
| COPYFLAG | A 1 bit register or flag 59 which when set to 1 indicates that the process is copying a |

| Abbreviation | Register |
| --- | --- |
| | -continued |
| | block of data to or from memory. |

The bank of registers 39 for priority 0 processes is the same as that already described for priority 1 processes. In the description that follows the suffix [1] indicates a register relevant to the priority 1 bank and the suffix [0] indicates that the register relates to the priority 0 bank. Where the priority is not known the suffix [Pri] indicates that a register of appropriate priority to the process is used.

The registers are generally of word length which is in this case is 16 bits apart from the 1 bit flags 47, 48, 58 and 59. The instruction buffer may be 8 bit length if arranged to hold only 1 instruction at a time. The A, B and C register stack 54, 55 and 56 are the sources and destinations for most arithmetic and logical operations. They are organised as a stack so that the loading of a value into the A register is preceded by relocating the existing contents of the B register into the C register and from the A register into the B register. Similarly storing a value derived from the A register causes the contents of the B register to be moved into the A register and the contents of the C register into the B register.

The TREG 49 is available to hold temporary values during the execution of all instructions apart from certain communication instructions which require copying of blocks of data and in that case the TREG 49 is used to indicate the action to be performed when the copying of the block of data is completed.

The OREG 57 of both register banks 38 and 39 are connected to the decoder 35 so that for both priority processes that part of the instruction which is fed into the 0 register reaches the decoder for use in generating appropriate microinstructions. The SNP FLAG 58 and COPY FLAG 59 of both priority banks are also connected to the condition multiplexor 36 so that the microinstructions can take into account the setting of these flags for either priority process in determining the next action to be effected by the processor at any time.

As the workspace point (WPTR) of a process is used as a base from which local variables of the process can be addressed, it is sometimes necessary to calculate offset values from the location indicated by the workspace pointer. The constants box 40 is connected to the Y bus and enables constant values to be placed on that bus under the control of the microinstruction ROM 13. These can be used in pointing to offset locations in a process workspace. In order to effect selection of one or other of the register banks 38 or 39, the register bank selector 41 has inputs from the PRI FLAG 47, the PROCPRI FLAG 48 and the microinstruction ROM 13. The output from the register bank selector is connected to the condition multiplexor 36, to the decoder 35 and to the switches 32. Depending on the output of the microinstruction ROM 13, the selector will chose the register bank indicated by the PRI FLAG 47 or the PROCPRI FLAG 48.

Memory Allocation for Process Workspaces

Figure 3:
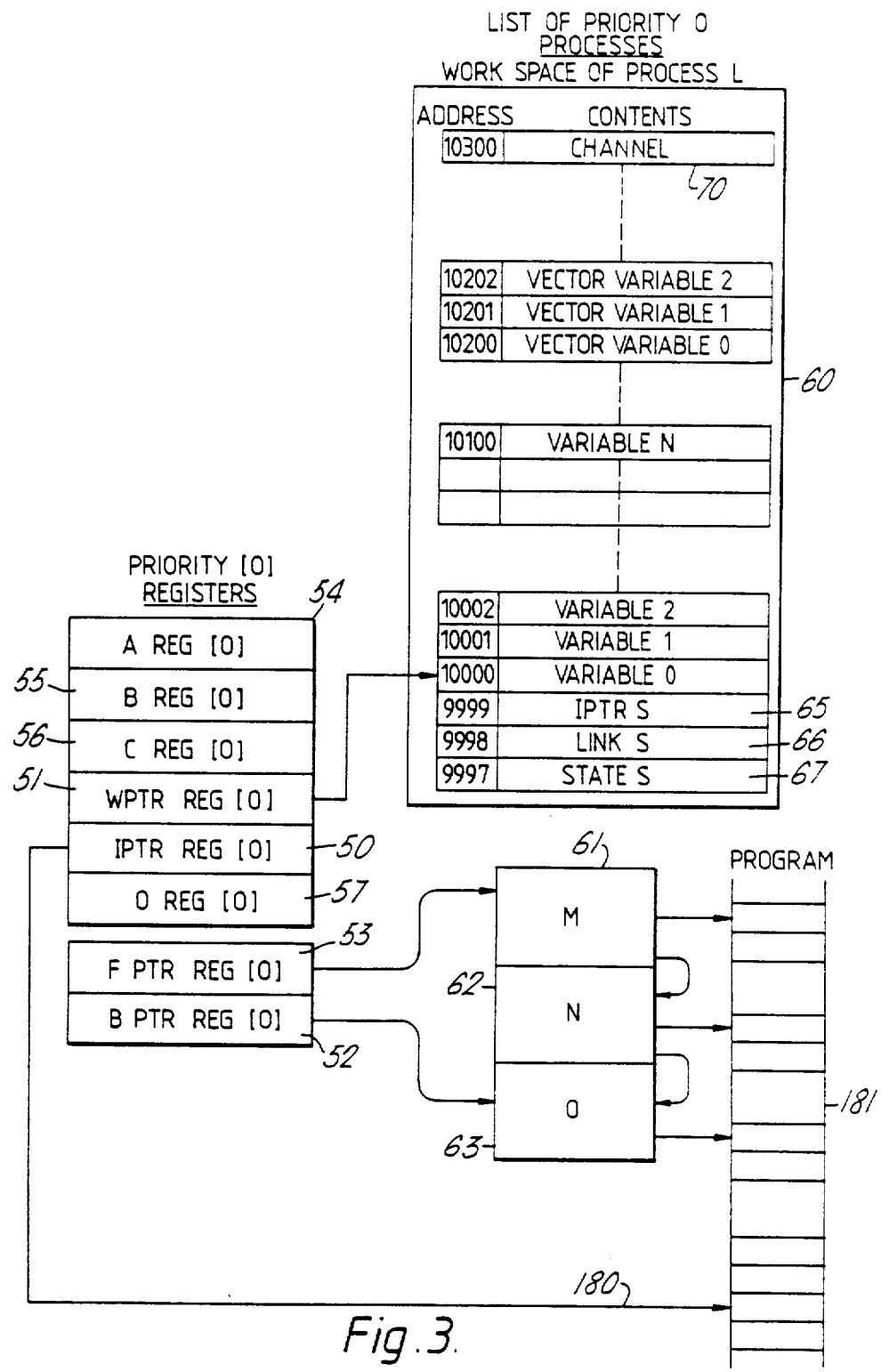
FIG. 3 illustrates the relationship between processor registers and the workspaces of a list of high priority processes for execution by the microcomputer.

As in the example described in the above mentioned patent applications, the microcomputer carries out a number of processes together sharing its time between them. Processes which are carried out together are called concurrent processes and at any one time the process which is being executed is called the current process. Each concurrent process has a region of memory called a workspace for holding the local variables and temporary values manipulated by the process. The address of the first local variable of the workspace is indicated by the workspace pointer (WPTR). This is indicated in FIG. 3 where four concurrent processes, Process L, M, N and O have workspaces 60, 61, 62 and 63. The workspace 60 has been shown in more detail and the workspace pointer held in the WPTR REG 51 points to the zero location which is a single word location having the address indicated in this example as 10000. The other local variables for this process are addressed as positive offset addresses from the word indicated by the workspace pointer. Some of the workspace locations with small negative offsets from the zero location are used for scheduling and communication purposes. In this example three additional word locations 65, 66 and 67 are shown having negative offsets of 1, 2 and 3 respectively below the zero location indicated by the WPTR. These three locations are as follows:

| Offset | Name of Offset | Name of Location |
|---|---|---|
| −1 | Iptr.s | Iptr location |
| −2 | Link.s | Link location |
| −3 | State.s | State location |

Location 65 is used when a process is not the current process to hold a pointer (IPTR) to the next instruction to be executed by the process when it becomes the current process. Location 66 is used to store a workspace pointer of a next process on a link list or queue of processes awaiting execution. Location 67 is normally used to contain an indication of the state of a process performing an alternative input operation or as a pointer for copying of a block of data. This will be described more fully below.

The memory also provides word locations for process to process communication and FIG. 3 indicates such a soft channel 70.

In addition to communication through soft channels provided by a single word in memory, external communication may occur through the serial links.

Serial Links

Figure 8:
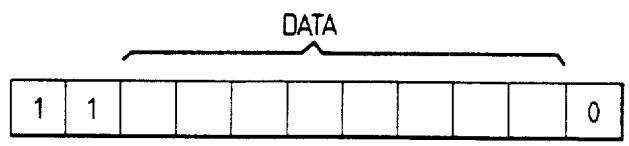
FIG. 8 illustrates the format of a data packet for transmission through a serial link between two microcomputers.

As described in the above mentioned patent application, data is transmitted from one microcomputer to another in the form of data packets having a predetermined protocol. The receipt of data is indicated by the transmission of an acknowledge packet. In this particular example, data is transmitted in the form of packet illustrated in FIG. 8. Each packet consists of a standard unit of data which in this case consists of 1 byte (8 bits). The data packet commences with 2 start bits each of 1 followed by the byte of data and terminating with a stop bit of 0. After transmission of each packet as shown in FIG. 8, the input channel of a serial link which receives the packet is arranged to signal to its associated output channel to transmit an acknowledge packet of the type shown in FIG. 9. This is merely a 2 bit packet starting with a 1 and terminating with a 0. The instructions executed by a process to send or receive data may require that more than one such packet of data is involved in the message transmission and consequently the instruction may indicate how many standard units or bytes of data are to be transmitted in order to complete the message required by the instruction. The structure of the links is shown more fully in FIGS. 10 to 14. In the examples shown in FIGS. 10 or serial links 70, 71, 72 and 73 are shown each having an input pin 26 and an output pin 27. Each link is connected by parallel buses 75 and 76 to the memory interface 14. The links are also connected to the interface control logic 15 by lines 77 and 78 which provide read request and write request signals respectively to the interface control logic. The control logic 15 is arranged to provide a "DATA VALID" signal to the links on a line 79. Each of the links is arranged to provide a status output signal on line 80 to the condition multiplexor 36 of FIG. 2. The Z bus is also connected to each of the links 70 to 73 and the Z bus is connected via line 81 to the sync logic 10. A line 82 provides an output from the microinstruction ROM 13 to the sync logic 10 and lines 83 provide an output from the sync logic 10 to the condition multiplexor 36. Lines 84 connect each of the links to the syn logic 10 for carrying request signals from the links when the links indicate a request for action by the processor. A line 85 connects the microinstruction ROM 13 to each of the links in order to provide request signals to the links from the processor.

Figure 11:
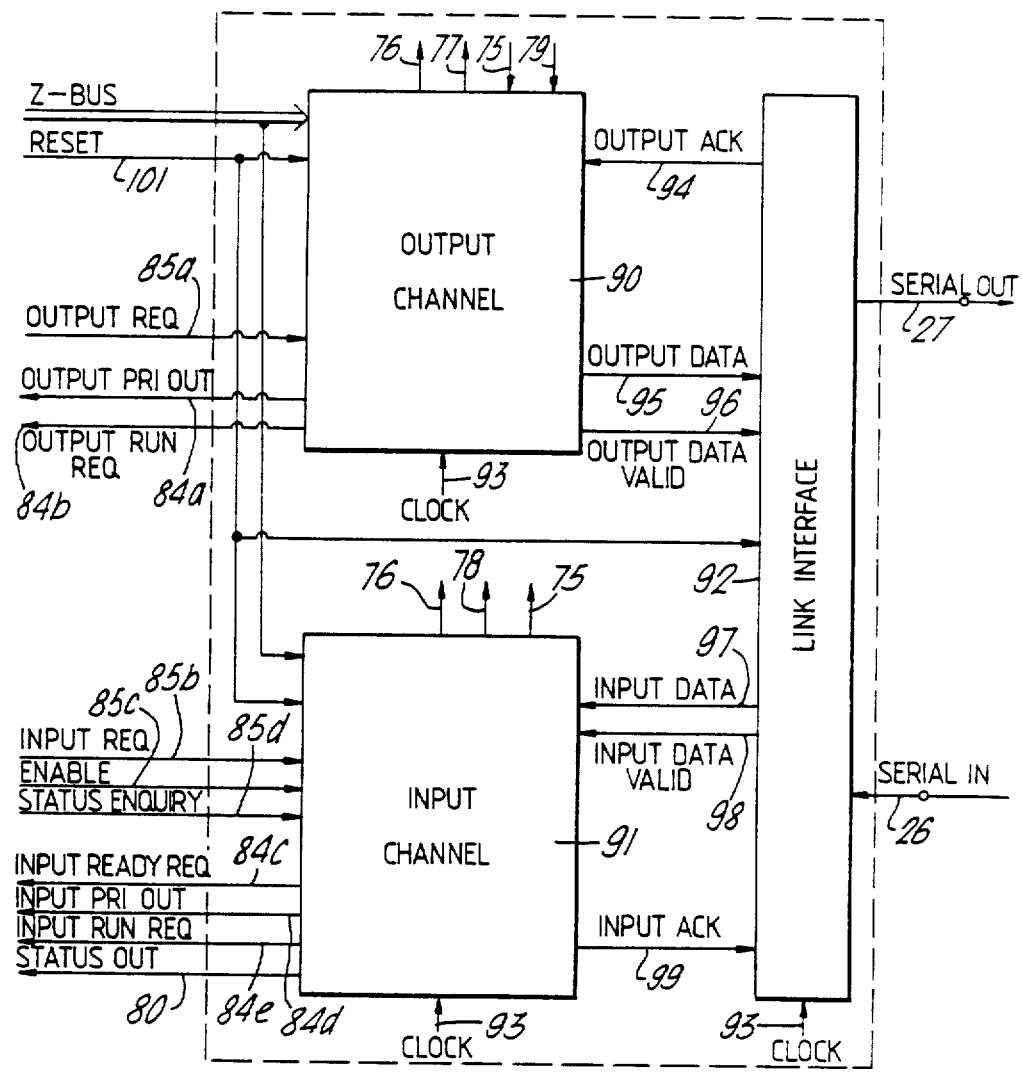
FIG. 11 illustrates more fully signals used in an output channel and an input channel of one serial link.

FIG. 11 shows more detail of one link. The link has an output channel 90 and an input channel 91. Both are connected to a link interface 92 which is shown more fully in FIG. 14. The link interface 92 is connected to the input pin 26 and output pin 27 and arranged to receive or transmit data and acknowledge packets as previously described with reference to FIGS. 8 and 9. The output channel 90, input channel 91 and link interface 92 are all supplied with clock pulses 93 from a common clock. The output channel 90 is arranged to receive from the link interface an OUTPUT ACK signal 94 and to supply to the link interface an OUTPUT DATA signal on bus 95 and an OUTPUT DATA valid signal on line 96. Similarly the input channel is arranged to receive from the link interface 92 INPUT DATA on line 97, and INPUT DATA VALID signal on line 98 and to send to the link interface an INPUT ACK signal on line 99.

A reset line 101 is connected to the output channel 90, the input channel 91 and the link interface 92.

The output channel 90 is arranged to output a predetermined number of bytes of data from a specified memory location by making read requests on line 77 for data to be copied from addresses given on bus 76. The data is supplied to the channel on parallel bus 75 together with an OUTPUT DATA VALID signal on line 79.

Similarly the input channel 91 is able to cause a specified number of bytes of data to be written into memory at a specified destination address by generating write requests on line 78 at memory addresses given on bus 76. The data is output to the memory on the parallel bus 75.

In order to communicate with the processor, both channels 90 and 91 are connected to the Z bus. The microinstruction ROM 13 may make an OUTPUT REQUEST on line 85a to the output channel 90. In the case of the input channel 91 the microinstruction ROM 13 may provide three different signals on the bus 85. It may make an INPUT REQUEST 85b or an ENABLE signal 85c or a STATUS ENQUIRY 85d. The bus 84 leading to the sync logic 10 may carry an OUTPUT RUN REQUEST 84b and an OUTPUT PRIORITY signal 84a from the output channel 90. The bus 84 may carry an INPUT READY REQUEST 84c with an INPUT PRIORITY signal 84d or an INPUT RUN REQUEST 84e with an INPUT PRIORITY signal from the input channel 91 to the sync logic 10.

The input channel 91 also provides a STATUS OUT signal on line 80.

The function of these signals will be explained more fully later.

Figure 12:
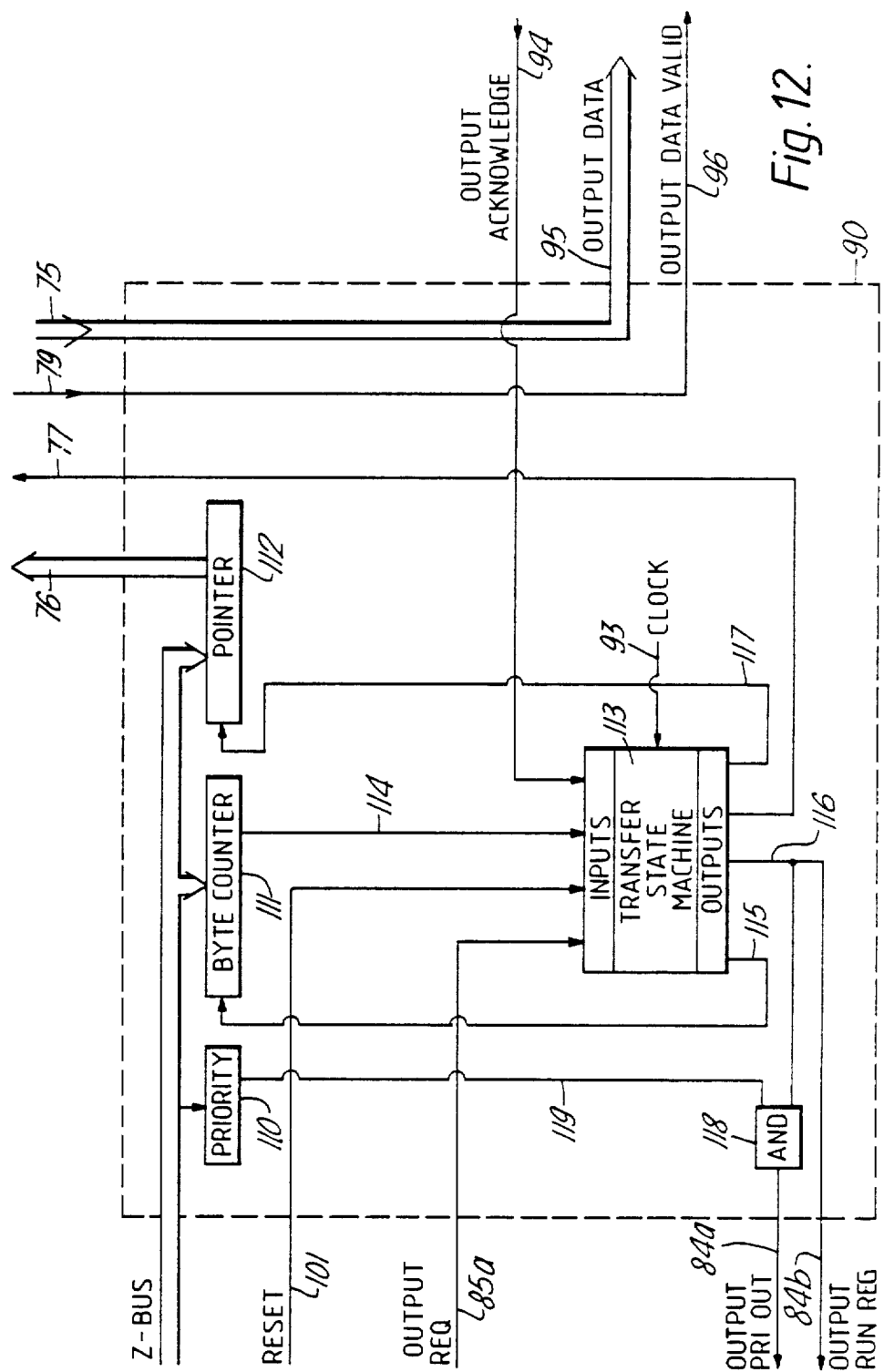
FIG. 12 shows further details of a output channel of a serial link.

FIG. 12 shows further detail of the output channel 90. The Z bus is connected to a priority register 110 used to indicate the priority of the process using the channel. The Z bus is also connected to a byte counter 111 and a pointer register 112 used to contain the address of the source of data to be indicated on bus 76. The channel also includes a transfer state machine 113. The state machines in the serial links each consist of a state register to hold the current state of the machine and a programmable logic array which responds to the value of the state register and various input signals to the state machine in order to produce a predetermined pattern of output signals and a new value for the state register.

The state machine 113 has four inputs. These are output request on line 85a, reset on line 101, output ack on line 94 and count zero on line 114. At the beginning of a message output the byte counter register 111 indicates the total number of bytes to be transmitted in the message but as each byte is transmitted the register will decrement under control of a deccount output signal 115 from the state machine 113 and will generate the count zero signal 114 when no bytes remain to be sent. In addition to the deccount output 115, the state machine 113 provides a read request output on line 77, a run request on line 116 and incpointer on line 117. The pointer register 112 initially contains the pointer to the first byte to be transmitted but due to the signal on line 117 the pointer is incremented as each byte is transmitted.

The output 116 is connected to the run request signal line which has been marked 84b and also to an AND gate 118 receiving a further input on line 119 from the priority register 110. In this way, the priority of the outputting process can be indicated on line 84a when a run request is made on line 84b. The signals on bus 75 and line 79 from the memory interface pass directly through the channel to the link interface 92 on lines 95 and 96. Bus 75 and line 95 transmit the value of the byte to be transmitted whereas lines 79 and 96 carry the output data valid signal which is generated by the memory interface to indicate that the data now sent properly represents a full byte of data.

The succession of transition states for the transfer state machine 113 is as follows:

| State | Inputs | Outputs | Next State |
| --- | --- | --- | --- |
| any | Reset | | Idle |
| Idle | Δ Outputreq | | Idle |
| Idle | Outputreq | | SendByte0 |
| SendByte0 | | ReadReq | SendByte1 |
| Sendbyte1 | | IncPointer | WaitOutputAck |
| WaitOutputAck | Δ OutputAck | | WaitOutputAck |
| WaitOutputAck | OutputAck | DecCount | CheckFinished |
| CheckFinished | Δ CountZero | | SendByte0 |
| CheckFinished | CountZero | RunRequest | Idle |

Figure 13:
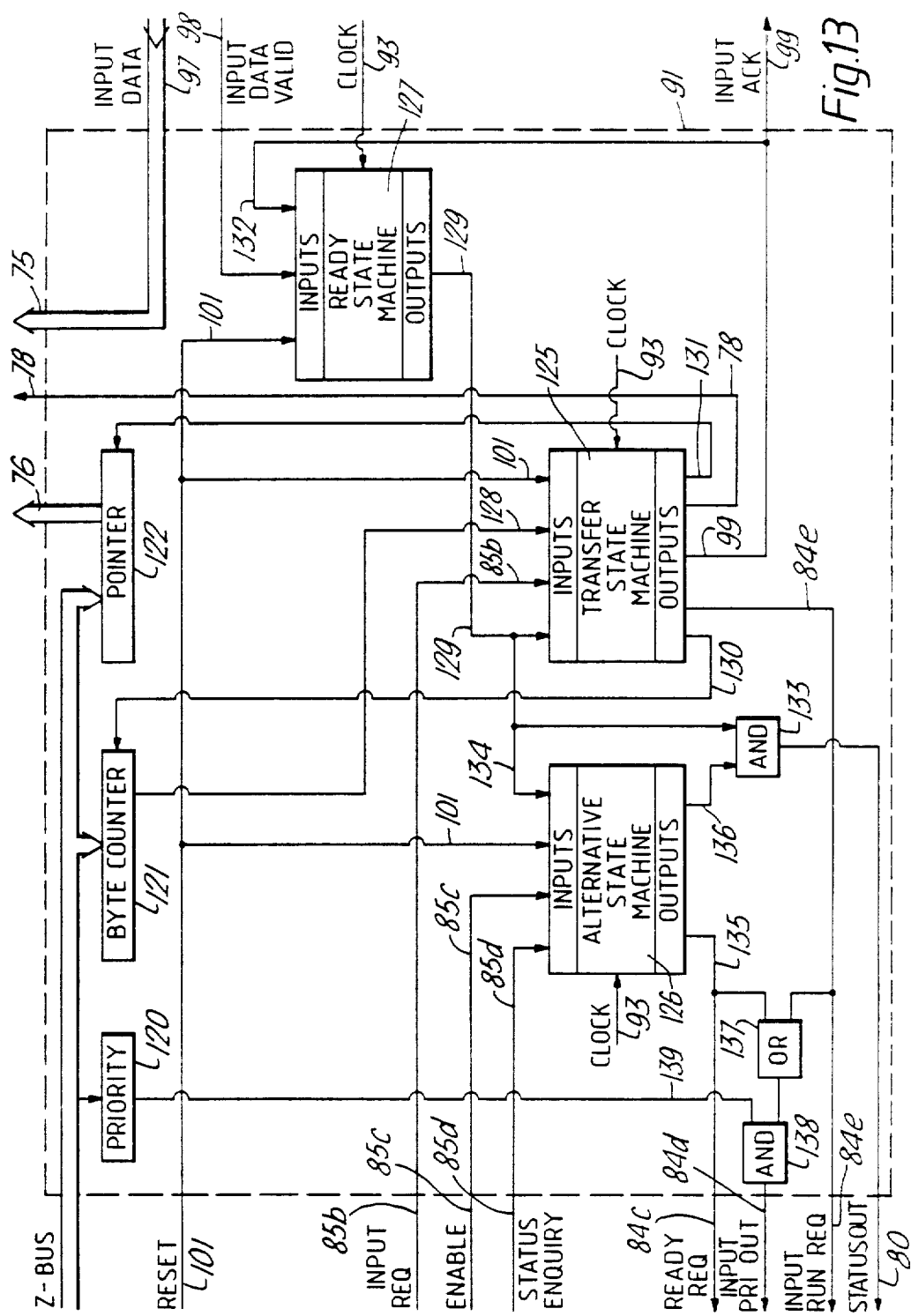
FIG. 13 shows further detail of an input channel of a serial link.

FIG. 13 shows more fully the input channel 91. This includes a priority flag or register 120, a byte counter register 121 and a pointer register 122 all connected to the Z bus. The input and output signals for the channel are controlled by three state machines. These consist of a TRANSFER state machine 125, an ALTERNATIVE state machine 126 and a READY state machine 127. Each of the state machines receives an input of clock pulses from the same source 93.

The TRANSFER state machine 125 controls the input of a message through the channel to a memory location. When the processor executes the instructions necessary to input a message, it loads the byte counter register 121 with an indication of the number of bytes to be input, the pointer register 122 is loaded with a pointer to the first memory location into which the message is to be copied and the priority flag 120 is set with an indication of the priority of the process executing the input instructions. The processor then effects an input request on line 85b which forms one of the inputs to the transfer state machine 125. The byte counter register 121 includes a decrementor arranged so that as each byte of input message is received the count is reduced until finally reaching zero. Similarly the pointer register 122 incorporates an incrementor so that as each byte is received the pointer increments to the memory destination address for the next byte of the input message.

The transfer state machine 125 has a reset input from line 101, a count zero state on line 128 from the byte counter 121, an input request from line 85b and a READY signal on line 129 from the READY state machine 127. The transfer state machine 125 has an output DECCOUNT on line 130 in order to decrease the byte counter 121. Similarly it has an output INCPOINTER on line 131 in order to increment the pointer register 122. It also provides an output write request on line 78, input ACK on line 99 and RUNREQ on line 84e.

The succession of states of the transfer state machine 125 is as follows:

| State | Inputs | Outputs | Next State |
| --- | --- | --- | --- |
| any | Reset | | Idle |
| Idle | Δ Inputreq | | Idle |
| Idle | Inputreq | | AwaitByte |
| AwaitByte | Δ Ready | | AwaitByte |
| AwaitByte | Ready | WriteRequest IncPointer DecCount | CheckFinished |
| CheckFinished | Δ CountZero | | AwaitByte |
| CheckFinished | CountZero | RunReq | Idle |

The READY state machine 127 can be in the form of a simple flip-flop and is used to indicate whether a byte of data has been received in an input register in the link interface and not yet acknowledged. The READY state machine 127 has a reset input 101 and in addition it has an input state input data valid on line 98 derived from the link interface when a valid byte of data has been received in an input register of the interface. In addition, the state machine 127 has an input 132 derived from the input ACK signal line 99 so that the state machine is set in one condition when a byte of data has been received by the link interface and is then reset once the input ACK signal has been sent on line 99. The state machine 127 provides a single output READY on line 129 which forms an input to the transfer state machine 125 as well as one input to an AND gate 133 as well as a READY input 134 to the alternative state machine 126. The succession of states of the READY state machine 127 is as follows:

| | Transitions | | |
|---|---|---|---|
| State | Inputs | Outputs | Next State |
| any | Reset | | DataAbsent |
| DataAbsent | Δ InputDataValid | | DataAbsent |
| DataAbsent | InputDataValid | Ready | DataPresent |
| DataPresent | ΔInputAck | Ready | DataPresent |
| DataPresent | InputAck | | DataAbsent |

The alternative state machine 126 deals with processes executing instructions for a number of alternative input channels. In addition to the READY input 134 it has a reset input 101 an enable input 85c and a status enquiry input 85d. It provides a READYREQ output 135 which leads to the signal line 84c. It provides a further output REPLY on line 136 which forms a second input to the AND gate 133. The output line 135 and 84e both form inputs to an OR gate 137. The OR gate provides an output to an AND gate 138 which also receives an input from line 139 indicating the priority of the process using the input channel.

By use of input signals on lines 85, the processor can make an input request or enable the channel or make a status enquiry and these will be described more fully below. The link provides RUN requests or READY requests on lines 84 and by use of the gates 137 and 138 the priority is indicated on line 84d when either a READY request or RUN request is made. The provision of the AND gate 133 enables the READY status to be indicated on line 80.

The succession of states of the alternative state machine 126 is as follows:

| | Transitions | | |
|---|---|---|---|
| State | Inputs | Outputs | Next State |
| any | Reset | | Disabled |
| Disabled | StatusEnquiry | | Disabled |
| Disabled | ΔStatusEnquiry / \ Enable / \ Ready | ReadyReq | Disabled |
| Disabled | ΔStatusEnquiry / \ Enable / \ Ready | | Enabled |
| Disabled | ΔStatusEnquiry / \ Enable | | Disabled |
| Enable | StatusEnquiry | Reply | Disabled |
| Enabled | ΔStatusEnquiry / \ Ready | ReadyReq | Disabled |
| Enabled | ΔStatusEnquiry / \ Ready | | Enabled |

Figure 9:
FIG. 9 illustrates the format of an acknowledge packet for transmission through a serial link between two microcomputers.
Figure 10:
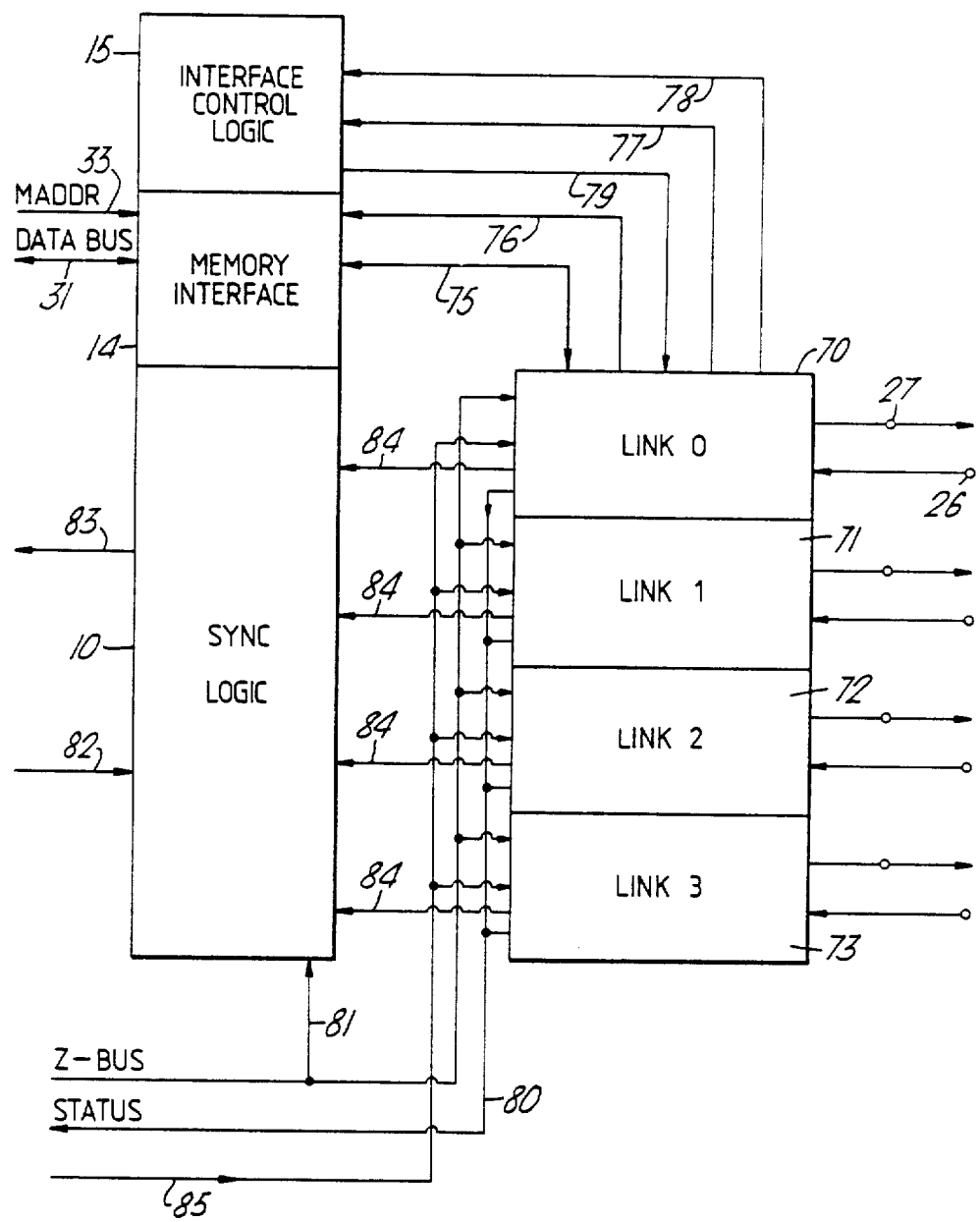
FIG. 10 illustrates four serial links of a microcomputer together with their interface arrangement with the rest of the microcomputer.

Although the output and input channels 90 and 91 communicate with the processor and with the memory, it is the link interface 92 which creates the data packets or acknowledge packets which are to be output in accordance with the protocol shown in FIGS. 8 and 9 and similarly to receive and recognise either of these packets which are output by a further microcomputer. The link interface consists of an output state machine 140 with a bit counter 141 and an input state machine 142 having a bit counter 143. It further includes an output register 144 connected to the output data bus 95 and arranged to receive a byte of data. An input register 145 is connected to the input pin 26 in order to receive incoming data. The register 145 is connected to the input data bus 97 leading to the memory interface. The link interface also includes two Ready Indicators, 146 and 147 which may each comprise a flip-flop. It further includes two latches 148 and 149 which may each comprise a flip-flop. It also includes three AND gates 150, 151 and 152 as well as an OR gate 153. The output state machine 140 has a plurality of inputs and outputs as follows:

| reference numeral | signal name | purpose |
|---|---|---|
| inputs: | | |
| 160 | Reset | Link interface reset connected to line 101 |
| 161 | Datago | Initiate data transmission |
| 162 | Countzero | Test if bit count zero |
| 163 | Ackgo | Initiate acknowledge transmission |
| outputs: | | |
| 164 | Loadcount | Set Bit Counter to number of bits to be transmitted |
| 165 | Deccount | Decrease bit counter by one |
| 166 | Oneout | Set output pin 27 to one |
| 167 | Dataout | Set output pin 27 to least significant bit of shift register |
| 168 | Shiftout | Shift data register one place |
| 169 | Datagone | Transmission of data complete |
| 170 | Ackgone | Transmission of acknowledge complete |

The input state machine 142 has inputs and outputs as follows:

| reference numeral | signal name | purpose |
|---|---|---|
| inputs: | | |
| 171 | Reset | Link interface reset connected to line 101 |
| 172 | Datain | Data from input pin 26 |
| 173 | Countzero | Test if bit count zero |
| outputs: | | |
| 174 | Loadcount | Set Bit Counter to number of bits to be received |
| 175 | Deccount | Decrease bit counter by one |
| 176 | Shiftin | Shift data register one place taking least significant bit from pin |
| 177 | Setdataready | Reception of data complete |
| 178 | Setackready | Reception of acknowledge complete |

The succession of states for the output state machine is as follows:

| OUTPUT STATE MACHINE 140 | | | |
|---|---|---|---|
| State | Inputs | Outputs | Next State |
| 1. any | Reset | | idle |
| 2. idle | (ΔDatago) / \ (ΔAckgo) | | idle |
| 3. idle | Ackgo | Oneout | ackflag |
| 4. idle | (ΔAckgo) / \ Datago | Oneout | dataflag |
| 5. ackflag | | Ackgone | idle |
| 6. dataflag | | Oneout Loadcount | databits |
| 7. databits | ΔCountzero | DecCount | databits |

-continued

| OUTPUT STATE MACHINE 140 | | | |
|---|---|---|---|
| State | Inputs | Outputs | Next State |
| 8. databits | Countzero | Shiftout<br>Dataout<br>Datagone | idle |

The succession of states for the input state machine 142 are as follows:

| INPUT STATE MACHINE 142 | | | |
|---|---|---|---|
| State | Inputs | Outputs | Next State |
| 1. any | Reset | | idle |
| 2. idle | ΔDatain | | idle |
| 3. idle | Datain | | start |
| 4. start | ΔDatain | SetAckready | idle |
| 5. start | Datain | LoadCount | databits |
| 6. databits | ΔCountzero | Shiftin<br>DecCount | databits |
| 7. databits | Countzero | Shiftin | dataend |
| 8. dataend | | SetDatready | idle |

For both state machines, where a specific output is listed under the output column, this means that a signal 1 is generated in order to indicate that specific output. At all other times the signal value of each output not listed is in the form of a zero. All inputs except those listed under the input column are ignored. The symbols V Λ and Δ are used to denote the boolean operations AND, OR and NOT respectively.

The purpose of the latch 148 is to control the output operation. Once a byte of data has been output the signal from output 169 sets the latch 148 to a state which controls the AND gate 150 to prevent further output until the latch 148 is reset by an acknowledge signal from output 178 from the input state machine. Similarly the latch 149 controls the input operation. When data has been received, the signal on line 177 sets the latch 149 to remember that data has been input until an acknowledgement is sent. It controls the AND gate 152 to permit an ACKGO input to the output state machine until the latch 149 is reset by the output 170 indicating that the acknowledge has gone.

The operation of this link interface is as follows. Consider first the situation where an output link wishes to output data. The output channel of FIG. 12 causes data to be supplied to the output register along bus 95 and an output data valid signal sets the Ready indicator 147. The output of the indicator 147 is fed to the AND gate 150 and the state of the latch 148 is such that a Datago signal is input at 161. The output on pin 27 is derived through the OR gate 153 and therefore consists either of the signal on the output 166 from the output state machine or the output of the AND gate 151 dependent on the signal supplied on output 167 from the output state machine. As can be seen from the table of transitions from the output state machine 140, when the machine is idle after being reset there is no indicated output for line 166 and consequently this transmits a signal level to the output pin 27 indicating a zero. When the DataGo signal is applied at input 161 this corresponds to line number 4 of the state table where there is an input DataGo and no AckGo signal. As indicated this causes the signal Oneout on output 166. This feeds a signal 1 to the output pin 27 and forms the first bit of the data packet shown in FIG. 8. The output state machine then moves to the state called "DataFlag" as can be seen from line 6 of the state table. In this condition with no further inputs the state machine causes a further Oneout signal on output 166 and a loadcount signal on output 164. This causes the second signal value 1 to be output by pin 27 thereby forming the two start bits of the data packet in FIG. 8. The bit counter 141 is also loaded with the number of bits to be output which in this case would be 8. The output state machine is then in the state called "databits" and as can be seen from lines 7 and 8 of the state table, this provides a dataout signal to the AND gate 151 so as to allow the data contents of the register 144 to be output to the output pin 27. A shiftout signal on output 168 causes sequential discharge of the data from the register 144 with a consequential decrement in the count in the bit counter 141. When the counter reaches zero as shown in line 8 of the state table a Datagone signal is output at 169 which changes the latch 148 and removes the Datago signal from the input 161. As can be seen from line 8 of the state table, no outputs on lines 166 and 167 are shown which means that the signal value 0 is resumed on line 166 which is fed through the OR gate 153 and the output pin 27 thereby forming the stop bit 0 at the end of the data packet shown in FIG. 8. The output state machine returns to the idle condition.

The output channel may also be used to send an acknowledge packet. When the input channel has received a byte of data it sends a signal to the output state machine in order to output an acknowledge packet of the type shown in FIG. 9. A signal is fed to the AND gate 152 from the Ready Indicator 146 and the state of the latch 149 at this time permits the ACKGO signal to be applied to input 163 of the output state machine 140. This corresponds to line 3 of the state table for the output state machine 140 and as can be seen, this causes the output oneout on the output 166. This is passed through the OR gate 153 so that the signal level on pin 27 is changed from the previous zero level to indicate a 1 forming the first bit of the acknowledge packet shown in FIG. 9. This changes the output state machine 140 to the state called ACKFLAG and as can be seen from line 5 of the state table for that machine, this causes no further outputs on lines 166 and 167 and this means that the signal level on output 166 changes back to the zero level so that the signal level on the output 27 reverts to zero giving the second bit of the acknowledge packet shown in FIG. 9. The output state machine 140 also discloses an output ACKGONE on line 170 so as to change the state of the latch 149 and thereby alter the output of the AND gate 152 so that the ACKGO signal is removed from the input 163. The state machine then returns to the idle state.

The operation of the input state machine 142 will now be described. The machine is reset by a reset signal on line 101 and in accordance with line 1 of the state table for the input state machine 142 this causes no listed outputs but puts the state machine into the idle state. As no outputs are listed the signals on all outputs will have a zero signal level. Input 172 is connected to the input pin 26 and so long as there is no DataIn signal the machine remains idle in accordance with line 2 of the state table. As soon as a DataIn signal is received at input 172 due to the arrival of a start bit of either a data packet of the type shown in FIG. 8 or an acknowledge packet of the type shown in FIG. 9 the state machine moves onto line 3 of the state table causing no listed output but moving to the state called start. If the next bit to arrive at the input pin 26 is a 0 in accordance with the acknowledge packet shown in FIG. 9 then line 4 of the state table for the input state machine 142 will apply. The machine has been put into the state called start by the arrival of the first bit of the packet but as the second bit is a 0 there is no longer a DataIn signal on line 172 and in accordance with line 4 of the state table this causes the output SETACKREADY on output 178 and the machine returns to the idle state. The output on line 178 is fed to the latch 148 in order to indicate to the output state machine that an acknowledge packet has been received. It is also fed to the Ready Indicator 147.

If however the second bit of the packet arriving at the input pin 26 was a 1 rather than a 0 such that the packet is a data packet of thee type shown in FIG. 8, the line 5 of the state table would apply in that the machine is in the start state due to the first bit of the data packet and the input is now DataIn on input 172. This causes the output loadcount on output 174 so that the bit counter 143 is loaded with the number of bits to be expected in the data packet. In this case the number of bits will be 8 corresponding to 1 byte of data. The machine moves to the new state databits and as can be seen from line 6 of the state table, so long as the input 173 does not reach zero the state machine continues to cause a succession of operations of moving the incoming bits successively along the input register 145 due to the shiftin signal on the output line 176 and it causes progressive decrease in the counter 143 due to the DECCOUNT signal on the output 175. When the count in the counter 143 reaches zero indicating that the required 8 bits of data have now been received, line 7 of the input state machine table applies in that the machine is still in the state databits and a count zero signal is received on line 173. This causes a shiftin output on line 176 to move the last databit into the input register 145 and the machine changes to the dataend state. Line 8 of the state table indicates that in this condition a SetDataready signal is output on line 177 to alter the latch 149 and the Ready Indicator 146. The input state machine 142 then returns to the idle state. The SetDataready signal which was supplied to the Ready Indicator 146 causes the signal "input data valid" on line 98 to indicate that a full byte of data has now been received by the input register 145.

Figure 14:
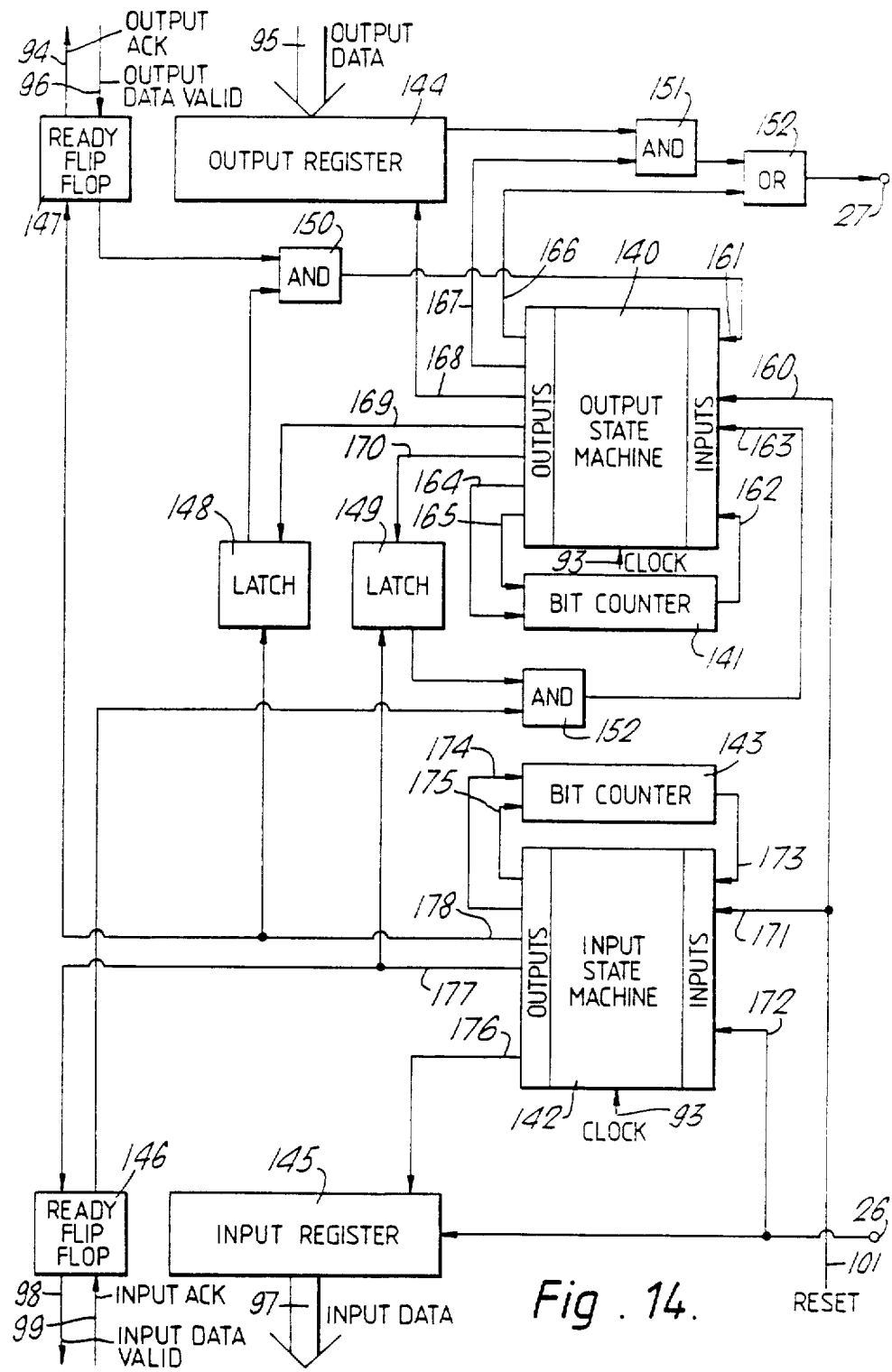
FIG. 14 shows a link interface for connecting output and input channels of a serial link to input and output terminals.
Figure 19A:
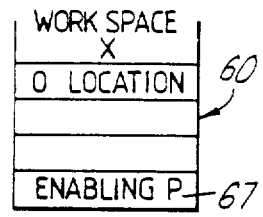
FIG. 19 illustrates in a sequence from 19(a) to 19(g) operations for effecting communication between two processes on the same microcomputer in which an inputting processes commences an "alternative input" operation before the outputting process commences at output operation and both processes have the same priority.
Figure 19B:
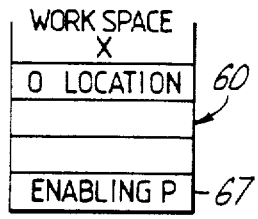
Figure 19C:
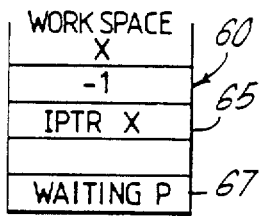
Figure 19D:
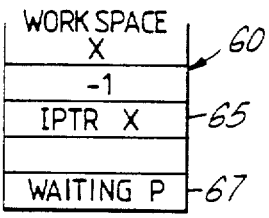
Figure 19E:
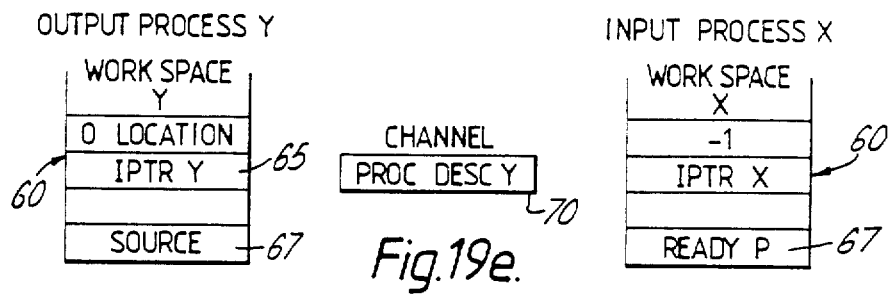
Figure 19F:
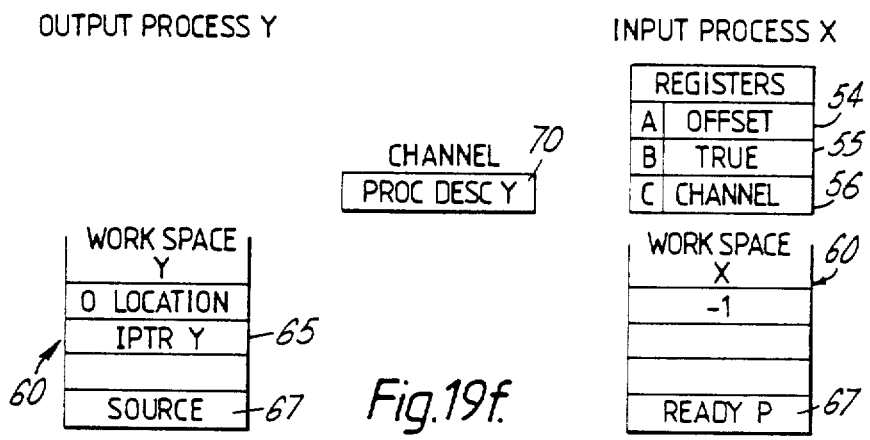
Figure 19G:
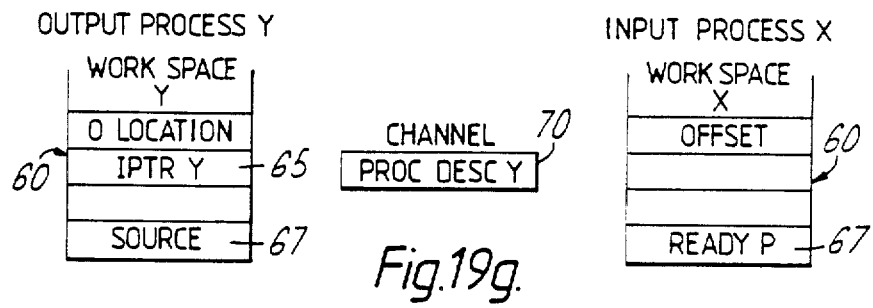

It will therefore be seen that the link interface shown in FIG. 14 provides a packet generator in the form of the output state machine 140 together with the associated bit counter latches and gates so that data may be output in packets of the type shown in FIG. 8 or acknowledge of the type shown in FIG. 9. The input state machine 142 together with its bit counter and latches forms a packet decoder which can distinguish between receipt at the input pin 26 of an acknowledge packet of the type shown in FIG. 9 or a data packet of the type shown in FIG. 8. In the case of a data packet it loads the input register 145 and provides an output from the Ready Indicator 146 when a complete byte has been received. In the case of an acknowledge packet it does not load the input register 145 but causes an output signal for use in controlling the output of the next data packet. That output signal alters latch 148 to permit transmission of the next datago signal through the AND gate 150. It also causes the output ACK signal on line 94 to indicate that a further byte to be output can now be supplied along bus 95 to the output register 144. When a byte of data has been received by the input register 145 and then transferred to its destination via bus 97, an input acknowledge signal is generated for line 99 so that an acknowledge packet must be sent by the output pin 27 before another byte of data can be input.

It will be seen that by use of the link interface shown in FIG. 14, a message may consist of one or more bytes of data each byte being separately transmitted in a packet of the type shown in FIG. 8. As each packet of the type shown in FIG. 8 is received by an input pin an acknowledge of the type shown in FIG. 9 must be output by the associated output pin before the next data packet can be input. Similarly the output pin must await an acknowledgement packet for each data packet which is output before it can proceed to outputting the next data packet.

Although each byte must be separately sent and acknowledged, the processor may be required to respond to a single output or input instruction by transmitting or receiving a message which consists of a plurality of bytes in order to complete the message transmission.

In the above described example all state machines in the input channel, output channel and link interface are supplied with timing pulses from a common clock. This will be used in controlling the bit frequency of the data and acknowledge packets transmitted by the output pin 27. It is assumed in the above example that other devices to which the link interface is connected in order to carry out message transmission are fed with timing pulses from the same clock. In this way synchronisation is achieved between the input state machine 142 and the incoming data from input pin 26. However the link interface may be arranged to operate with synchronising logic between the input pin 26 and the input state machine 142 so that different devices which are connected together for communication purposes may use different clocks. Such different clocks should have the frequency although they may have different phase. Such synchronising logic may be arranged to sample an incoming bit pattern at a frequency higher than the frequency of the bit pattern in the message so that the signal level is sampled several times for each incoming bit. In this way the leading edge of a start bit can be detected and the signal level at the input pin 26 may be treated as valid a predetermined time after detecting the leading edge of the start bit. In this way sampling of the incoming data is effected approximately midway through the duration of each incoming bit.

Notation

In the following description of the way in which the microcomputer operates, particularly with reference to its functions, operations and procedures, notation is used in accordance with the OCCAM (Trade Mark of INMOS International plc) language. This language is set forth in the booklet entitled "*Programming Manual-OCCAM*" published and distributed by INMOS Limited in 1983 in the United Kingdom. Furthermore the notation used has been set out fully in European patent application No. 0110642 and for simplicity will not be repeated in this specification. However the explanation of OCCAM and the notation used which is set out in European patent application No. 0110642 is incorporated herein by reference.

In addition to the above mentioned notation the following description refers to certain memory access procedures which are defined as follows:

AtWord(Base, N, A): sets A to point at the Nth word past Base

AtByte(Base, N, A): sets A to point at the Nth byte past Base

RIndexWord(Base, N, X): sets X to the value of the Nth word past Base

RIndexByte(Base, N, X): sets X to the value of the Nth byte past Base

WIndexWord(Base, N, X): sets the value of the Nth word past Base to X

WIndexByte(Base, N, X): sets the value of the Nth byte past Base to X

WordOffset(Base, X, N): set N to the number of words between X and Base

PROCEDURES USED BY THE MICROCOMPUTER

In the following description thirteen different procedures (PROC) are referred to. The following six procedurees are used in the description of the behaviour of the processor.

Dequeue
Run
StartNextProcess
HandleRunRequest
HandleReadyRequest
BlockCopyStep

Procedure "Dequeue" makes the process on the front of the priority "Pri" process queue the current process.

```
1.  PROC Dequeue =
2.  SEQ
3.      WptrReg[Pri] := FptrReg[Pri]
4.      IF
5.          FptrReg[Pri] = BptrReg[Pri]
6.              FptrReg[Pri] := NotProcess.p
7.          TRUE
8.              RIndexWord(FptrReg[Pri], Link.s, FptrReg[Pri])
9.      RIndexWord(WptrReg[Pri], Iptr.s, IptrReg[Pri]) :
```

Procedure "Run" schedules the process whose descriptor is contained in the ProcDesc register. This will cause a priority 0 process to start running immediately, in preference to an already executing priority 1 process.

```
1.  PROC Run =
2.  SEQ
3.      ProcPriFlag := ProcDescReg /\ 1
4.      ProcPtrReg := ProcDescReg /\ (NOT 1)
5.      IF
6.          (Pri = 0) OR ((ProcPriFlag = Pri) AND
              (WptrReg[Pri] <> NotProcess.p))
7.              SEQ -- add process to queue
8.                  IF
9.                      FptrReg[ProcPriFlag] = NotProcess.p
10.                         FptrReg[ProcPriFlag] := ProcPtrReg
11.                     TRUE
12.                         WIndexWord(BptrReg[ProcPriFlag],
                            Link.s, ProcPtrReg)
13.                 BptrReg[ProcPriFlag] := ProcPtrReg
14.         TRUE
15.             SEQ -- either Pri 0 interrupting Pri 1, or Pri 1
                and idle m/c
16.                 Pri := ProcPriReg
17.                 WptrReg[Pri] := ProcPtrReg
18.                 RIndexWord(WptrReg[Pri], Iptr.s, IptrReg[Pri])
19.                 Oreg[Pri] := 0 :
```

Procedure "StartNextProcess" deschedules the current process and, if there is another runnable process, selects the next runnable process. This may cause the resumption of an interrupted priority 1 process if there are no further priority 0 processes to run.

Procedure "StartNextProcess" is always executed as a result of the SNPFlag being set. The first action of this process is, therefore, to clear that flag.

```
1.  PROC StartNextProcess =
2.  SEQ
3.      SNPFlag[Pri] := 0    -- Clear the SNP flag
4.      IF
5.          FptrReg[Pri] <> NotProcess.p
6.              Dequeue
7.          Pri = 0
8.              SEQ
9.                  Pri := 1
10.                 IF
11.                     (WptrReg[Pri] = NotProcess.p) AND
12.                     (FptrReg[Pri] <> NotProcess.p)
13.                         Dequeue
14.                     TRUE
15.                         SKIP
16.         Pri = 1
17.             WptrReg[Pri] := NotProcess.p :
```

Procedure "HandleRunRequest" is executed as a result of a link making a "RunRequest" to the processor. In the description of the procedure "PortNo" is the number of the link making the request. The procedure operates by loading the "ProcDescReg" with the content of the process word associated with the link and executing the "Run" procedure.

```
1.  PROC HandleRunRequest(VAR PortNo) =
2.  SEQ
3.      RIndexWord(PortBase, PortNo, ProcDescReg)
4.      Run :
```

Procedure "HandleReadyRequest" is executed as a result of a link making a "ReadyRequest" to the processor. In the description of the procedure "PortNo" is the number of the link. Port Base is the address of the first link. The procedure identifies the process which is performing alternative input from the content of the process word associated with the link. The procedure schedules that process if appropriate and updates the State location of that process as appropriate.

```
1.  PROC HandleReadyRequest(VAR PortNo) =
2.  SEQ
3.      RIndexWord(PortBase, PortNo, ProcDescReg)
4.      ProcPtrReg := ProcDescReg /\ (NOT 1)
5.      RIndexWord(ProcPtrReg, State.s, TempReg)
6.      IF
7.          TempReg = Enabling.p
8.              WIndexWord(ProcPtrReg, State.s, Ready.p)
9.          TempReg = Ready.p
10.             SKIP
11.         TempReg = Waiting.p
12.             SEQ
13.                 WIndexWord(ProcPtrReg, State.s, Ready.p)
14.                 Run :
```

The procedure "BlockCopyStep" causes a single byte of a message to be transferred. The procedure always executes as a result of the "CopyFlag" being set. If the procedure has copied the last byte of a message it clears (unsets) the "CopyFlag" and, if the "Treg" contains a process descriptor that process is scheduled.

```
1.  PROC BlockCopyStep =
2.  SEQ
3.      RIndexByte(Creg[Pri], 0, Oreg[Pri])
```

-continued

```
4.      WIndexByte(Breg[Pri], 0, Oreg[Pri])
5.      Oreg[Pri] := 0
6.      AtByte(Creg[Pri], 1, Creg[Pri])
7.      AtByte(Breg[Pri], 1, Breg[Pri])
8.      Areg[Pri] := Areg[Pri] - 1
9.      IF
10.        Areg[Pri] = 0 -- has the block copy been completed
12.        SEQ
13.           CopyFlag[Pri] := 0
14.           IF
15.              Treg[Pri] <> NotProcess.p
16.              SEQ
17.                 ProcDescReg := Treg[Pri]
18.                 Run
19.              Treg[Pri] = NotProcess.p
20.                 SKIP
21.        TRUE
22.           SKIP :
```

The processor performs a sequence of actions. These are performed either on behalf of the current process or on behalf of a link.

The actions which may be performed on behalf of the current process are to perform "StartNextProcess", to perform "BlockCopyStep" or to fetch, decode and execute an instruction.

The actions which may be performed on behalf of a link are to perform "HandleRunRequest" or to perform "HandleReadyRequest".

Each of these actions corresponds to a sequence of microinstructions. The last microinstruction in any of the sequences comprising these actions is "NextAction". This causes the processor to choose the next action to be performed.

The way in which the processor decides which action is to be performed next when a "NextAction" microinstruction is executed is as described below.

The Sync Control Logic 10 will forward at most one "RunRequest" or "ReadyRequest" to the processor at any time. The Sync Control Logic will not forward a priority 1 request if there is a priority 0 request outstanding. This results in two signals entering the Condition Multiplexor, one indicating the presence of a request, the other indicating the priority of that request.

The Condition Multiplexor also has signals coming from the currently selected SNPFlag and the currently selected CopyFlag. It is, therefore, able to make the selection as described below.

The processor will perform "StartNextProcess" if the SNPFlag[Pri] is set. Otherwise, the processor will handle a channel request, unless the priority of that request is lower than the priority of the current process. Otherwise, the processor will perform "BlockCopyStep" if the CopyFlag[Pri] is set. Otherwise the processor will fetch, decode and execute an instruction if there is a current process. Otherwise the processor will wait until there is a channel request.

The description of the Function Set which follows refers to the additional seven procedures:
  CauseLinkInput
  CauseLinkOutput
  MakeLinkReadyStatusEnquiry
  EnableLink
  LinkChannelInputAction
  LinkChannelOutputAction
  IsThisSelectedProcess The four procedures "CauseLinkInput", "CauseLinkOutput", MakeLinkReadyStatusEnquiry" and "EnableLink" describe interaction between the process and a link.

The procedure "CauseLinkInput(VAR PortNo)" loads link channel PortNo with a priority, a pointer and a count and then makes an InputRequest to that link channel which causes the link channel to input a message. More precisely, the processor loads the Priority flag, the Pointer register and the Count register of the link channel from the Pri flag, Creg[Pri] register and Areg[Pri] register of the processor, and makes an InputRequest to the link channel.

The procedure "CauseLinkOutput(VAR PortNo)" loads link channel PortNo with a priority, a pointer and a count and makes an OutputRequest; which causes the link channel to output a message. More precisely, the processor loads the Priority flag, the Pointer register and the Count register of the link channel from the Pri flag, Creg[Pri] register and Areg[Pri] register of the processor, and makes an OutputRequest to that link channel.

The procedure "MakeLinkReadyStatusEnquiry(VAR PortNo, Ready), makes a ReadyStatusEnquiry to link channel PortNo. "Ready" is set to TRUE if the link channel is ready, FALSE if it is not ready.

The procedure "EnableLink(VAR PortNo)" sets the Priority flag of link channel PortNo to the value of the Pri flag and signals an EnableRequest to the link channel.

The remaining procedures are described as follows:

```
1. PROC LinkChannelInputAction =
2.    VAR PortNo :
3.    SEQ
4.       WIndexWord(WptrReg[Pri], Iptr.s, IptrReg[Pri])
5.       WIndexWord (Breg[Pri], 0, WptrReg[Pri] \ / Pri)
6.       WordOffset(PortBase, Breg[Pri], PortNo)
7.       CauseLinkInput (PortNo)
8.       SNPFlag[Pri] := 1 :
1. PROC LinkChannelOutputAction =
2.    VAR PortNo :
3.    SEQ
4.       WIndexWord(WptrReg[Pri], Iptr.s, IptrReg[Pri])
5.       WIndexWord(Breg[Pri], 0, WptrReg[Pri] \ / Pri)
6.       WordOffset(PortBase, Breg[Pri], PortNo)
7.       CauseLinkOutput(PortNo)
8.       SNPFlag[Pri] := 1 :
1. PROC IsThisSelectedProcess =
2.    -- this is used by all the disable instructions
3.    SEQ
4.       RIndexWord(WptrReg[Pri], 0, Oreg[Pri])
5.       IF
6.          Oreg[Pri] = (-1)
7.          SEQ
8.             WIndexWord(WptrReg[Pri], 0, Areg[Pri])
9.             Areg[Pri] := MachineTRUE
10.         Oreg[Pri] <> (-1)
11.            Areg[Pri] := MachineFALSE :
```

FUNCTION SET

As in European patent specification No. 0110642, each instruction for the microcomputer includes a function element selected from a function set. The functions executed by the microcomputer include direct functions, the prefixing functions pfix and nfix, and an indirect function opr which uses the operand register Oreg to select one of a set of operations. As in the above patent application, the Oreg[Pri] is cleared after the execution of all instructions except PFIX and NFIX.

The improved set of direct functions and operations of the present application is as follows:

DIRECT FUNCTIONS

| Code No | Abbreviation | Name |
|---|---|---|
| 0 | ldl | load local |
| 1 | stl | store local |
| 2 | ldlp | load local pointer |
| 3 | ldnl | load non-local |
| 4 | stnl | store non-local |
| 5 | ldnlp | load non-local pointer |
| 6 | eqc | equals constant |
| 7 | ldc | load constant |
| 8 | adc | add constant |
| 9 | j | jump |
| 10 | cj | conditional jump |
| 11 | call | call |
| 12 | ajw | adjust workspace |
| 13 | opr | operate |
| 14 | pfix | prefix |
| 15 | nfix | negative prefix |

OPERATIONS

| Code No | Abbreviation | Name |
|---|---|---|
| 0 | rev | reverse |
| 1 | ret | return |
| 2 | gcall | general call |
| 3 | gajw | general adjust workspace |
| 4 | ldpi | load pointer to instruction |
| 5 | bsub | byte subscript |
| 6 | wsub | work subscript |
| 7 | bcnt | byte count |
| 8 | wcnt | word count |
| 9 | lend | loop end |
| 10 | lb | load byte |
| 11 | sb | store byte |
| 12 | copy | copy message |
| 13 | gt | greater than |
| 14 | add | add |
| 15 | sub | subtract |
| 16 | mint | minimum integer |
| 17 | startp | start process |
| 18 | endp | end process |
| 19 | runp | run process |
| 20 | stopp | stop process |
| 21 | ldpri | load priority |
| 22 | in | input message |
| 23 | out | output message |
| 24 | alt | alt start |
| 25 | altwt | alt wait |
| 26 | altend | alt end |
| 27 | enbs | enable skip |
| 28 | diss | disable skip |
| 29 | enbc | enable channel |
| 30 | disc | disable channel |

DIRECT FUNCTIONS load local
  def: SEQ
    Creg[Pri] := Breg[Pri]
    Breg[Pri] := Areg[Pri]
    RIndexWord(WptrReg[Pri], Oreg[Pri], Areg[Pri])
  purpose: to load the value of a location in the current
    process workspace
store local
  def: SEQ
    WIndexWord(WptrReg[Pri], Oreg[Pri], Areg[Pri])
    Areg[Pri] := Breg[Pri]
    Breg[Pri] := Creg[Pri]
  purpose: to store a value in a location in the current
    process workspace
load local pointer
  def: SEQ
    Creg[Pri] := Breg[Pri]
    Breg[Pri] := Areg[Pri]
    AtWord(WptrReg[Pri], Oreg[Pri], Areg[Pri])
  purpose: to load a pointer to a location in the current
    process workspace
    to load a pointer to the first location of a
    vector of locations in the current process
    workspace
load non-local
  def: RIndexWord(Areg[Pri], Oreg[Pri], Areg[Pri])
  purpose: to load a value from an outer workspace
    to load a value from a vector of values
    to load a value, using a value as a pointer
    (indirection) - in this case Oreg = 0
store non-local
  def: SEQ
    WIndexWord(Areg[Pri], Oreg[Pri], Breg[Pri])
    Areg[Pri] := Creg[Pri]
  purpose: to store a value in a location in an
    outer workspace
    to store a value in as vector of values
    to store a value, using a value as a
    pointer (indirection) - in this case
    Oreg = 0
load non-local pointer
  def: AtWord(Areg[Pri], Oreg[Pri], Areg[Pri])
  purpose: to compute pointers to words in word
    vectors and workspaces
equals constant
  def: IF
    Areg[Pri] = Oreg[Pri]
      Areg[Pri] := MachineTRUE
    TRUE
      Areg[Pri] := MachineFALSE
  purpose: to test that the Areg holds a constant value
    to implement logical
    negation
    to implement
      a = c    as eqc c
      a < > c  as eqc c, eqc 0
load constant
  def: SEQ
    Creg[Pri] := Breg[Pri]
    Breg[Pri] := Areg[Pri]
    Areg[Pri] := Oreg[Pri]
  purpose: to load a value
add constant
  def: Areg[Pri] := Areg[Pri] + Oreg[Pri]
  purpose: to add a value
jump
  def: AtByte(IptrReg[Pri], Oreg[Pri], IptrReg[Pri])
  purpose: to transfer control forwards or backwards,
    providing loops, exits from loops,
    continuation after conditional sections of
    program
conditional jump
  def: IF
    Areg[Pri] = 0
      AtByte(IptrReg[Pri], Oreg[Pri], IptrReg[Pri]
    Areg[Pri] < > 0
      SEQ
        Areg[Pri] := Breg[Pri]
        Breg[Pri] := Creg[Pri]
  purpose: to transfer control forwards or backwards
    only if a zero value is loaded, providing
    conditional execution of sections or program
    and conditional loop exits
    to facilitate comparison of a value against
    a set of values
call
  def: SEQ
    WIndexWord(WptrReg[Pri], -1, Creg[Pri])
    WIndexWord(WptrReg[Pri], -2, Breg[Pri])

-continued

|  |  |
|---|---|
| | WIndexWord(WptrReg[Pri], -3, Areg[Pri])<br>WIndexWord(WptrReg[Pri], -4, IptrReg[Pri])<br>Areg[Pri] := IptrReg[Pri]<br>AtWord(WptrReg[Pri], -4, WptrReg[Pri]<br>AtByte(IptrReg[Pri], Oreg[Pri], IptrReg[Pri]) |
| purpose:<br>adjust<br>workspace | to call a procedure |
| def: | AtWord(Wptr[Pri], Oreg[Pri], Wptr[Pri]) |
| purpose: | to adjust the workspace pointer |

| Indirect Functions | |
|---|---|
| operate | |
| Definition: | operate (OREG[PRI] |
| Purpose: | perform an operation, using the contents of the operand register OREG[PRI] as the code defining the operation required. |
| Prefixing Functions | |
| prefix | |
| Definition: | OREG[PRI] := OREG[PRI] << 4 |
| Purpose: | to allow instruction operands which are not in the range 0-15 to be represented using one or more prefix instructions |
| negative prefix | |
| Definition: | OREG[PRI] := (NOT OREG[PRI] << 4 |
| Purpose: | to allow negative operands to be represented using a single negative prefix instruction followed by zero or more prefix instructions |

OPERATIONS FOR REGISTER MANIPULATION ETC

| reverse | |
|---|---|
| def: | SEQ<br>Oreg[Pri] := Areg[Pri]<br>Areg[Pri] := Breg[Pri]<br>Breg[Pri] := Oreg[Pri] |
| purpose: | to reverse operands of asymmetric operations, where this cannot conveniently be done in a compiler |
| return | |
| def: | SEQ<br>RIndexWord(WptrReg[Pri], 0, IptrReg[Pri])<br>AtWord(WptrReg[Pri], 4, WptrReg[Pri]) |
| purpose: | to return from a called procedure |
| general call | |
| def: | SEQ<br>Oreg[Pri] := IptrReg[Pri]<br>IptrReg[Pri] := Areg[Pri]<br>Areg[Pri] := Oreg[Pri] |
| purpose: | to perform a procedure call, with a new instruction pointer in Areg |
| general adjust workspace | |
| def: | SEQ<br>Oreg[Pri] := WptrReg[Pri]<br>WptrReg[Pri] := Areg[Pri]<br>Areg[Pri] := Oreg[Pri] |
| purpose: | to change the workspace of the current process |

OPERATIONS FOR ADDRESSING

| load pointer to instruction | |
|---|---|
| def: | AtByte(IptrReg[Pri], Areg[Pri], Areg[Pri]) |
| purpose: | to load a pointer to an instruction |
| byte subscript | |
| def: | SEQ<br>AtByte(Areg[Pri], Breg[Pri], Areg[Pri]) |

|  |  |
|---|---|
| | Breg[Pri] := Creg[Pri] |
| purpose: | to compute pointers to items in vectors to convert a number to a byte pointer using, for example, ldc 0, ldw n, bsub |
| word subscript | |
| def: | SEQ<br>AtWord(Areg[Pri], Breg[Pri], Areg[Pri])<br>Breg[Pri] := Creg[Pri] |
| purpose: | to compute pointers to items in vectors of words to convert a number to a word pointer using, for example, ldc 0, ldl n, wsub |
| byte count | |
| def: | Areg[Pri] := Areg[Pri] * TraBytesPerWord |
| purpose: | to convert a length measured in words to one measured in bytes. TraBytesPerWord means the number of bytes per word used by the microcomputer. |
| word count | |
| def: | SEQ<br>Creg[Pri] := Breg[Pri]<br>Breg := bytepart(Areg)<br>Areg := wordpart(Areg) |
| purpose: | to convert a pointer into a byte offset from 0 using wcnt, bcnt, add |

LOOPING

| loop end | |
|---|---|
| def: | SEQ<br>RIndexWord(Breg[Pri], 1, Creg[Pri])<br>Creg[Pri] := Creg[Pri] - 1<br>WIndexWord(Breg[Pri], 1, Creg[Pri])<br>IF<br>  Creg[Pri] > 0<br>    SEQ<br>      RIndexWord(Breg[Pri], 0, Creg[Pri])<br>      Creg[Pri] := Creg[Pri] + 1<br>      WIndexWord(Breg[Pri], 0, Creg[Pri])<br>      AtByte(IptrReg[Pri], -Areg[Pri], IptrReg[Pri])<br>  TRUE<br>    SKIP |
| purpose: | to implement replicators |

SINGLE BYTE OPERATIONS

| load byte | |
|---|---|
| def: | RIndexByte(Areg[Pri], 0, Areg[Pri]) |
| purpose: | to load a single byte |
| store byte | |
| def: | SEQ<br>WIndexByte(Areg[Pri, 0, Breg[Pri])<br>Areg[Pri] := Creg[Pri] |
| purpose: | to store a single byte |

BYTE STRING OPERATIONS

| copy message | | |
|---|---|---|
| def: | SEQ | |
| | Copy[Pri] := 1 | indicate block copy |
| | Treg[Pri] :=<br>NotProcess.p | indicate not input or output |
| purpose: | to set a vector of bytes to the value of another block | |

COMPARISON

```
greater
than
    def: SEQ
           IF
              Breg[Pri] > Areg[Pri]
                 Areg[Pri] := MachineTRUE
              TRUE
                 Areg[Pri] := MachineFALSE
           Breg[Pri] := Creg[Pri]
    pur    to compare Areg and Breg (treating them as twos
    pose:  complement integers), loading 1 (MachineTRUE) if
           Breg is greater than Areg, 0 (MachineFALSE)
           otherwise
           to implement b < a by (rev, gt)
           to implement b <=0 a as (gt, eqc 0), and Breg >= Areg
           by (rev, gt, eqc 0)
```

BASIC ARITHMETIC

```
add
    def:        SEQ
                   Areg[Pri] := Areg[Pri] + Breg[Pri]
                   Breg[Pri] := Creg[Pri]
    purpose: to
             load
             the
             sum
             of
             Breg
             and
             Areg
subtract
    def: SEQ
            A-
            reg[-
            Pri]
            :=
            Bre-
            g[Pr-
            i] -
            Areg[Pri]
            Br-
            eg[-
            Pri]
            :=
            Creg[Pri]
    purpose: to
             sub-
             stract
             Areg
             from
             Breg,
             loading
             the
             result
             to
             implement
                 a = b              as sub, eqc 0
                 a <> b             as sub, eqc 0, eqc 0
                 if a <> b          as sub, eqc 0, cj,
                 if a = b           as sub, cj
```

OPERATIONS FOR SCHEDULING

```
minimum integer
    def: SEQ
            Creg[Pri] := Breg[Pri]
            Breg[Pri] := Areg[Pri]
            Areg[Pri] := MostNeg
    purpose: to access hard channels
             to initialise soft channels
start process
    def: SEQ
            AtByte(IptrReg[Pri], Breg[Pri], Oreg[Pri])
            WIndexWord(Areg[Pri], Iptr.s, Oreg[Pri])
            ProDescReg := Areg[Pri] \ / Pri
            Run
    purpose: to add a process to the end of the active
             process list
end process
    def: SEQ
            RIndexWord(Areg[Pri], 1, Oreg[Pri])
            IF
               Oreg[Pri] = 1
                  SEQ
                     RIndexWord(Areg[Pri], 0, IptrReg[Pri])
                     WptrReg[Pri] := Areg[Pri]
               Oreg[Pri] <> 1
                  SEQ
                     WIndexWord(Areg[Pri], 1, Oreg[Pri]-1)
                     SNP[Pri] := 1
    purpose: to join two parallel processes; two words are
             used, one being a counter, the other a pointer
             to a workspace, when the count reaches 1,
             the workspace is changed
run process
    def: SEQ
            ProDescReg := Areg[Pri]
            Run
    purpose: to run a process at a specified priority
stop process
    def: SEQ
            WIndexWord(WptrReg[Pri], Iptr.s,
            IptrReg[Pri])
            SNP[Pri] := 1
    purpose: to deschedule the current process
load priority
    def: SEQ
            Creg[Pri] := Breg[Pri]
            Breg[Pri] := Areg[Pri]
            Areg[Pri] := Pri
    purpose: to obtain the priority of the current process
```

OPERATIONS FOR MESSAGE COMMUNICATION

In the following description of input message and output message, hard (Breg) is TRUE if Breg is a pointer to a hard channel (a process location of a serial link), FALSE otherwise. Similarly, soft (Breg) is FALSE if Breg is a pointer to a hard channel, TRUE otherwise.

```
input message
 1.  def:       entered with
 2.                Areg = count
 3.                Breg = channel
 4.                Creg = destination
 5.   IF
 6.      hard(Breg[Pri])
 7.         LinkChannelInputAction
 8.      soft(Breg[Pri])
 9.         SEQ
10.            RIndexWord(Breg[Pri], 0, Treg[Pri])
11.            IF
12.               Treg[Pri] = NotProcess.p
13.                  SEQ
14.                     WIndexWord(Breg[Pri], 0, WptrReg[Pri] \ / Pri)
15.                     WIndexWord(WptrReg[Pri], Iptr.s, IptrReg[Pri])
16.                     WIndexWord(WptrReg[Pri], State.s, Creg[Pri])
17.                     SNPFlag[Pri] := 1
18.               Treg[Pri] <> NotProcess.p
19.                  SEQ
20.                     
21.                     WIndexWord(Breg[Pri], 0, NotProcess.p)
                        reset channel
22.                     prepare for block copy
23.                     Treg already contains process descriptor
24.                     Areg already contains count
25.                     Breg[Pri] := Creg[Pri] destination
```

-continued
```
26.              ProcPtrReg := Treg[Pri] / \(NOT 1)
27.              RIndexWord(ProcPtrReg.State.s, Creg[Pri]) source
28.              CopyFlag[Pri] := 1 set copy flag
purpose: to input a block of bytes from a channel
output message
1.   def:        entered with
2.                   Areg = count
3.                   Breg = channel
4.                   Creg = source
5.   IF
6.       hard(Breg[Pri])
7.           LinkChannelOutputAction
8.       soft(Breg[Pri])
9.           SEQ
10.              RIndexWord(Breg[Pri], 0, Ireg[Pri])
11.              IF
12.                  Treg[Pri] = NotProcess.p
13.                      SEQ
14.                          WIndexWord(Breg[Pri], 0,
                                 WptrReg[Pri] \ / Pri)
15.                          WIndexWord(WptrReg[Pri], Iptr.s,
                                 IptrReg[Pri])
16.                          WIndexWord(WptrReg[Pri], State.s,
                                 Creg[Pri])
17.                          SNPFlag[Pri] := 1
18.                  Treg[Pri] <> NotProcess.p Ready
19.                      SEQ
20.                          ProcPtrReg := Treg[Pri] \ /(NOT 1)
21.                          read the State location
22.                          RIndexWord(ProcPtrReg, State.s, Oreg[Pri])
23.                          check for Alternative process or Input process
24.                          IF
25.                              Oreg[Pri] = Enabling.p
26.                                  SEQ
27.                                      WIndexWord(ProcPtrReg , State.s, Ready.p)
28.                                      WIndexWord(Breg[Pri], 0, WptrReg[Pri] \ / Pri)
29.                                      WIndexWord(WptrReg[Pri], Iptr.s, IptrReg[Pri])
30.                                      WIndexWord(WptrReg[Pri], State.s, Creg[Pri])
31.                                      SNPFlag[Pri] := 1
32.                              Oreg[Pri] = Waiting.p
33.                                  SEQ
34.                                      WIndexWord(ProcPtrReg. State.s, Ready.p)
35.                                      WIndexWord(Breg[Pri], 0, WptrReg[Pri] \ / Pri)
36.                                      WIndexWord(WptrReg[Pri], Iptr.s, IptrReg[Pri])
37.                                      WIndexWord(WptrReg[Pri], State.s, Creg[Pri])
38.                                      SNPFlag[Pri] := 1
39.                                      ProcDescReg := Trg[Pri]
40.                                      Run
41.                              Oreg[Pri] = Ready.p
42.                                  SEQ
43.                                      WIndexWord(Breg[Pri], 0. WptrReg[Pri] \ / Pri)
44.                                      WIndexWord(WptrReg[Pri], Iptr.s, IptrReg[Pri])
45.                                      WIndexWord(WptrReg[Pri], State.s, Creg[Pri])
46.                                      SNPFlag[Pri] := 1
47.                              TRUE - Oreg[Pri] contains a valid pointer
48.                                  SEQ
49.                                      Reset channel
50.                                      WIndexWord(Breg[Pri], 0, NotProcess.p)
51.                                      Set up registers for block copy:
52.                                          Treg[Pri] already contains description
                                                inputting process
53.                                      CopyFlag[Pri] := 1 indicate block copy
54.                                      Breg[Pri] := Oreg[Pri] destination
purpose: to output a block of bytes to a channel
```

OPERATIONS FOR ALTERNATIVE INPUT

```
alternative start
1.   def: WIndexWord(WptrReg[Pri], State.s, Enabling.p)
     purpose: to initialise the process state location
              prior to enabling alternative inputs
alternative wait
1.   def: SEQ
2.          WIndexWord(WptrReg[Pri], 0, -1)
3.          RIndexWord(WptrReg[Pri], State.s, Areg[Pri])
4.          IF
5.              Areg[Pri] = Ready.p
6.                  SKIP
7.              TRUE
8.                  SEQ
9.                      WIndexWord(WptrReg[Pri], State.s, Waiting.p)
10.                     WIndexWord(WptrReg[Pri], Iptr.s, IptrReg[Pri])
11.                     SNPFlag[Pri] := 1
purpose: to wait for one of a number of enabled channels
alternative end
     def:   SEQ
1.              RIndexWord(WptrReg[Pri], 0, Oreg[Pri])
2.              AtByte(IptrReg[Pri], Oreg[Pri], IptrReg[Pri])
purpose: to start execution of the selected input
         of an alternative process
enable skip
1.   def: IF
2.              Areg[Pri] <> MachineFALSE
3.                  WIndexWord(WptrReg[Pri], State.s, Ready.p)
4.              Areg[Pri] = MachineFALSE
5.                  SKIP
purpose: to enable a SKIP guard
disable skip
     def: SEQ
            IF
                Breg[Pri] <> MachineFALSE
                    IsThisSelectedProcess
                Breg[Pri] = MachineFALSE
                    Areg[Pri] := MachineFALSE
            Breg[Pri] := Creg[Pri]
purpose: to disable a SKIP guard
enable channel
1.   def: SEQ
2.          IF
3.              Areg[Pri] = MachineFALSE
4.                  SKIP
5.              Areg[Pri] <> MachineFALSE
6.                  SEQ
7.                      IF
8.                          soft(Breg[Pri])
9.                              SEQ
10.                                 RIndexWord(Breg[Pri], 0, Oreg[Pri])
11.                                 IF
12.                                     Oreg[Pri] = NotProcess.p
13.                                         WIndexWord(Breg[Pri], 0,
                                                WptrReg[Pri] \ / Pri)
14.                                     Oreg[Pri] =
                                            (WptrReg[Pri] \ / Pri)
15.                                         SKIP
16.                                     TRUE
17.                                         WIndexWord(WptrReg[Pri],
                                                State.s,Ready.p)
18.                         hard(Breg[Pri])
19.                             VAR PortNo, Ready :
20.                             SEQ
21.                                 WordOffset(PortBase, Breg[Pri], PortNo)
22.                                 MakeLinkReadyStatusEnquiry(PortNo,Ready)
23.                                 IF
24.                                     Ready
25.                                         WIndexWord(WptrReg[Pri],State.s,Ready.p)
26.                                     TRUE
27.                                         SEQ
28.                                             WIndexWord(Breg[Pri], 0,
                                                    Pri] \ / Pri)
29                                              EnableLink(PortNo)
30.                     Breg[Pri] : = Creg[Pri]
purpose: to enable a channel input
disable channel
1.   usage: On     Areg = Instruction Offset
            entry
2.                 Breg = Guard
3.                 Creg = Channel
4.          On exit IF
```

-continued

```
5.                    this was selected guarded process
6.                    Areg = MachineTRUE
7.                 otherwise
8.                    Areg = MachineFALSE
9.      def: IF
10.          Breg[Pri] = MachineFALSE
11.          Areg[Pri] : = MachineFALSE
12.          Breg[Pri] < > MachineFALSE
13.          IF
14.             soft(Creg[Pri])
15.             SEQ
16.                RIndexWord(Creg[Pri]. 0, Breg[Pri])
17.                IF
18.                   Breg[Pri] = NotProcess.p
19.                      Areg[Pri] := MachineFALSE
20.
                        Breg[Pri] = (WptrReg[Pri] \ / Pri)
21.                SEQ
22.                   WIndexWord(Creg[Pri], 0,
                          NotProcess.p)
23.                   Areg[Pri] := MachineFALSE
24.       TRUE
25.          IsThisSelectedProcess
26.       hard(Creg[Pri])
27.          VAR PortNo, Ready :
28.          SEQ
29.             WordOffset(PortBase, Creg[Pri], PortNo)
30.             Check if link channel is Ready.
31.             This will cause channel to be disabled.
32.             MakeLinkReadyStatusEnquiry(PortNo,
                    Ready)
33.             IF
34.                Ready
35.                   IsThisSelectedProcess
36.                TRUE
37.                   Areg[Pri] := MachineFALSE
purpose:  to disable an enabled channel
          to select one of a number of
          alternative enabled inputs
```

It will be understood that the microinstruction ROM 13 contains microinstructions corresponding to all the above listed functions and operations whereby the processor is caused to carry out any of the above actions as a result of microinstructions derived from the ROM 13.

Scheduling

The processor shares its time between a number of concurrent processes executing at the two different priority levels 0 and 1. A priority 0 process will always execute in preference to a priority 1 process if both are able to execute. At any time only one of the processes is actually being executed and this process which is the current process has its workspace pointer (WPTR) in the WPTR REG 51 and an instruction pointer (IPTR) in the IPTR REG 50 indicates the next instruction to be executed from the sequence of instructions in the program relating to that particular process. Any process which is not the current process and is not awaiting execution is descheduled. When a process is scheduled it either becomes the current process or is added to a list or queue of processes awaiting execution. Such a list is formed as a linked list with each process on the list having a pointer in the link location 66 of its workspace to the workspace of the next process on that list. The instruction pointer (IPTR) of any process on the list is stored in the IPTR location 65 of its workspace as shown in FIG. 3.

Figure 4:
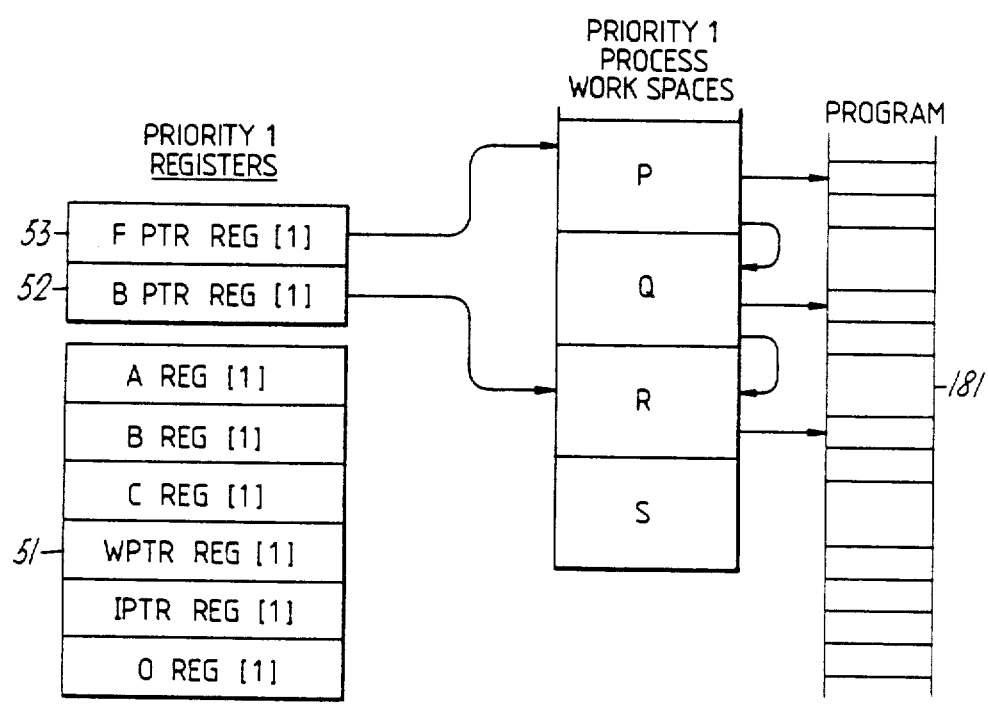
FIG. 4 is similar to FIG. 3 but illustrates a list of low priority processes while a high priority process is being executed.

In the present case, the processor maintains two lists of processes which are waiting to be executed, for for each priority level. This situation is shown in FIGS. 3 and 4. FIG. 3 indicates the high priority 0 list whereas FIG. 4 shows a low priority 1 list at a time when a priority 0 process is the current process as shown in FIG. 3. As the current process in this case is a high priority 0 process, the register bank selector 41 has selected the registers in bank 39 for use by the processor. Consequently WPTR REG (0) holds a pointer to the zero location of the workspace 60 of the current process L as indicated in FIG. 3. The IPTR REG (0) contains a pointer 180 to the next instruction in the program sequence 181 which is stored in memory. The registers 54, 55, 56 and 57 indicated in FIG. 3 contain other values to be used during execution of the current process L. The list of priority 0 processes which have been scheduled and are awaiting execution is indicated in FIG. 3 by the three processes M, N and 0 whose workspaces are indicated diagrammatically at 61, 62 and 63. Each of these workspaces is generally similar to that indicated for process L. The FPTR REG (0) marked 53 contains the pointer to the workspace of process M which is the process at the front of this list. The workspace of process M contains in its IPTR location 65 a pointer to the next instruction in the program sequence which is to be executed when process M becomes the current process. The link location 66 of process M contains a pointer to the workspace of process N which is the next process on the list. The last process on the list indicated is process 0 which has its workspace indicated at 63. The BPTR REG (0) marked 52 contains a pointer to the workspace of this last process 0. The workspace 63 of this process 0 is pointed to by the contents of the link location 66 of the previous process N but in this case the link location 66 of process 0 does not contain any pointer as this is the last process on the list.

When a further process is added to the list a pointer to the workspace of that further process is placed in the BPTR REG 52 and the link location 66 of the process 0 then contains a pointer to the workspace of the further process which is added to the list.

The priority 1 list is generally similar and this is indicated in FIG. 4. In this case the list of priority 1 processes which have been scheduled and are awaiting execution consists of the processes P, Q and R. A further priority 1 process marked S is shown but this is currently descheduled and does not form part of the link list. The FPTR REG (1) contains a pointer to the workspace of process P which forms the first process on the list awaiting execution. The BPTR REG (1) contains a pointer to the workspace of process R which forms the last process on the list awaiting execution. Each of the processes P, Q and R has an IPTR in its IPTR location pointing to the program stage from which the next instruction is to be taken when that process becomes the current process. The link location of each process apart from the last process on the list contains a pointer to the workspace of the next process on the list.

The position shown in FIG. 4 is that the WPTR REG (1) marked 51 does not contain a valid pointer to a process workspace on the assumption that the current priority 0 process became the current process without interrupting a priority 1 process prior to its completion.

When a process becomes ready to run, for example as a result of the completion of some communication, it is either executed immediately or it is appended to the appropriate list. It will be run immediately if it is a priority 0 process and no priority 0 process is being executed or if it is a priority 1 process and no process is being executed at all. A process may continue to execute until it engages in communication on a channel which requires descheduling of the process or if it is a priority 1 process until it is temporarily stopped or interrupted to allow a more urgent priority 0 process to run.

When a priority 0 process is executed the PRI FLAG 47 is set to 0. When the processor is executing a priority 1 process or has no processes to run the PRI FLAG 49 has the value 1. If there are no processes to run, the WPTR (1) register has the value Not Process p. This will be the position for the WPTR REG 51 shown in FIG. 4 where there is a list of priority 1 processes without any interrupted priority 1 process. If a priority 1 process had been interrupted to allow execution of a priority 0 process the workspace pointer of the interrupted priority 1 process would remain in the WPTR REG (1). Consequently when there are no more priority 0 processes to be run the processor determines whether a priority 1 process was interrupted by means of the contents of the WPTR (1) register. If this has the value Not Process p then there was not an interrupted process and the processor checks the priority 1 list by looking at the contents of the FPTR REG (1). If however WPTR REG (1) still contains a workspace pointer the processor can continue executing the interrupted process. If there is no process waiting on either of the priority lists then the appropriate FPTR REG will contain the value Not Process p.

New concurrent processes are created either by executing a "start process" operation or by executing a "run process" operation. They terminate either by executing a "end process" operation or by executing a "stop process" operation.

A process may be taken from the top of a list for execution by use of the procedure "dequeue" which has been defined above. That definition, together with various other definitions above, include line numbers which are not part of the definition but merely facilitate explanation. Line 1 of the definition of Procedure DEQUEUE merely gives the name of the procedure and line 2 indicates that a sequence of events are to occur. According to line 3 the WPTR REG 51 of the appropriate bank 38 or 39 takes the pointer which has been held in the FPTR REG 53 of the same bank. Line 4 indicates that a test of certain conditions is to be carried out. Line 5 indicates that if the contents of the BPTR REG 52 are found to be the same as the contents of the FPTR REG 53 then in accordance with line 6 the value "Not Process p" is loaded into the FPTR REG. Line 7 indicates that if the condition of line 5 was not found to be the case then line 7 applies in that the FPTR REG 53 of the appropriate register bank is loaded with the pointer currently stored in the link location 66 of the workspace previously pointed to by the contents of the FPTR REG. Finally, in accordance with line 9 the IPTR REG 50 is loaded with the IPTR from the IPTR location 65 of the workspace now pointed to by the contents of the WPTR REG 51.

The effect of this is to advance the list by taking the front process off and loading it into the appropriate registers ready for execution.

A current process may be descheduled by the procedure "start next process" which has been defined above. A current process may execute an instruction which involves setting the SNP FLAG 58 to the value 1 and in that case, when the processor responds to a microinstruction requiring it to take the next action, the processor will execute the procedure in accordance with the above definition. According to line 3 of the definition the processor initially clears the flag by setting SNP FLAG 58 to the value 0. Line 4 requires the processor to test whether the condition of line 5 is true. Provided the FPTR register does not contain the value "Not Process p" then according to line 6 the dequeue procedure will occur so that the next process is taken off the top list. If however line 5 had not been true this would indicate that there was no process waiting on a list for the current priority. The processor would then check whether the condition of line 7 was true. That involves testing whether the PRI FLAG 47 has the value 0. If it does then we know that there is no priority 0 process waiting due to the result of the test in line 5 and consequently the processor goes on to the sequence commencing with line 9 of setting the priority flag to 1. This causes the processor to examine the register bank for the priority 1 processes and in accordance with lines 11 and 12 the processor checks to see whether the WPTR REG (1) contains the value "Not Process p" and that the FPTR REG (1) does not contain the value "Not Process p". This means that there was no interrupted priority 1 process which has left its WPTR in the WPTR REG 51 and that there is a waiting priority 1 process on the list. Provided this condition is true then according to line 13 the processor executes the procedure dequeue which causes the next priority 1 process to be taken off the front of the list. If however the condition of lines 11 and 12 were not correct then according to lines 14 and 15 the processor skips any action. This means that if there had been a WPTR in the WPTR REG (1) the processor will continue to execute that interrupted process. If there had not been an interrupted process and there had been nothing waiting on the priority 1 list then the processor will await scheduling of a further process. If however the processor had found that the condition in line 7 was not correct but on the other hand the priority was 1 then in accordance with lines 16 and 17 the WPTR REG (1) will take the value "Not Process p".

During message transition a process may be descheduled while waiting for a communicating process to reach a corresponding stage in its program. When the two communicating processes reach a corresponding stage the procedure "run" may be used to schedule a process whose descriptor is contained in the PROCDESC register 46. The action of the processor can then be understood from the definition of the procedure "run" set out above. In accordance with line 3 the priority of the process indicated by the PROCDESC register 46 is calculated and loaded into the PROCPRIFLAG 48. According to line 4 the WPTR of the process having its descriptor in register 46 is calculated and loaded into the PROCPTR REG 45. The processor then tests to see whether the conditions of line 6 apply. The current process has a priority of 0 or if the priority in the PROCPRIFLAG 48 is the same as the priority in the PRIFLAG 47 and at the same time the WPTR REG 51 of the current process contains a workspace pointer then the processor carries out the sequence following line 7. Line 7 merely explains that the sequence is that necessary to add a process to the queue. Line 8 requires that the processor carry out a test whether the condition of line 9 is true. Provided that the FPTR REG of the priority indicated by the flag 48 has the value "Not Process p" then according to line 10 that FPTR REG is loaded with the pointer of register 45. That makes the rescheduled process the top of the list. Line 11 indicates that if the condition of line 10 was not correct then the pointer contained in register 46 is written into the link location 66 of the last process on the list indicated by the BPTR REG of the appropriate priority. That BPTR REG is then loaded with a pointer to the contents of register 45. In other words the rescheduled process is added to the end of the list. Line 14 means that if the condition of line 6 was not the case then the sequence of line 15 will occur. In this case line 16 requires that the PRIFLAG 47 will take the value currently in the PROCPRIFLAG 48 and according to line 17 the WPTR REG of the appropriate priority will be loaded with the pointer from register 45. Line 18 requires that the IPTR REG 50 of appropriate priority will be loaded with the IPTR taken from the IPTR location 65 of the process indicated by the pointer in the WPTR REG 51. Line 19 inserts the value zero into the 0 register of the appropriate priority bank.

Process to Process Communication

One process may communicate with another using a soft channel provided by one addressable word location in memory. Alternatively a process on one microcomputer may communicate with a process on another microcomputer through the serial links using hard input and output channels. The serial links each have an input pin and an output pin connected to corresponding pins of another microcomputer by a single wire which forms a unidirectional non-shared communication path. For both internal and external communication each outputting process executes one "output message" operation as defined above for each message to be output and each inputting process executes an "input message" operation as defined above for each message to be input. In accordance with this embodiment the message length to be transmitted for each "output message" or "input message" operation may be of variable length. Data is transmitted in one or more units of specified bit length and in this case the bit length is 8 bits forming 1 byte. The message may therefore consist of one or a plurality of units or bytes depending on the length of the message that is required. In order to understand the manner in which communication is effected various examples will now be described.

EXAMPLE 1

Process Y wishes to output a message to process X on the same microcomputer using a soft channel where both processes are of the same priority. This is illustrated in the sequence of FIG. 15. Initially the channel 70 contains the value "Not Process p" as neither process Y nor process X have yet executed an instruction which requires use of that channel. When process Y reaches the point in its program where it wishes to execute an output it loads into its AREG 54 a count indicating the number of bytes which constitute the message, it loads into the BREG 55 the address of the channel to be used for the communication and it loads into the CREG the source address which is the memory address for the first byte of the message to be transmitted. This is in accordance with lines 2, 3 and 4 of the definition of the operation "output message". Further line number references will relate to the definition of output message given above. Line 5 requires the processor to test the contents of the B register to see whether the channel address given corresponds to that of a hard channel. If it does then line 7 of the definition requires the processor to carry out the procedure "link channel output action" which has been defined above. In the example of FIG. 15 that is not the case and consequently line 8 of the definition is found to be true in that the B register contains the address of a soft channel. Consequently the processor carries out the sequence following line 9. In accordance with line 10 the TREG 49 is loaded with the value pointed to by the pointer from the B register with no offset i.e. the channel content. Lines 11 and 12 then require the processor to check whether the TREG contains the value Not Process p and this is of course the case in FIG. 15b. Consequently the processor carries out the sequence of lines 14 to 17 of the output message definition. Line 14 requires the process descriptor for process Y to be written into the channel 70. Line 15 requires the contents of the IPTR REG 50 to be stored in the IPTR location 65 of the workspace for process Y and line 16 requires the source address to be written into the state location 67 of the workspace of process Y. Line 17 requires the SNPFLAG to be set to 1 indicating that process Y should be descheduled by the next action of the processor. That is the position shown in FIG. 15c and remains the position until the inputting process X executes an input instruction.

Again process X first loads into its A register 54 a count of the number of bytes required for the message it is to input. It loads into its B register the address of the channel to be used for the input and its C register is loaded with the destination address in the memory for the first byte to be input. This is in accordance with lines 2, 3 and 4 of the definition of input message and is the position shown in FIG. 15d. Lines 5, 6 and 7 of the input message definition require the processor to check whether the address in the B register corresponds to a hard channel in which case the processor would be required to execute the link channel input action procedure. That is not the case in FIG. 15 as the B register points to the soft channel 70. Consequently the condition of line 8 is true and the sequence following line 9 occurs. Firstly the T register 49 for process X is loaded with the value pointed to by the pointer in thez B register with no offset i.e. the channel content. If that value had been "Not Process p" then the processor would have followed lines 13 to 17 which would have resulted in descheduling process X. However, in the present case the T register is found to meet the requirement of line 18 of the definition in that it does not contain "Not Process p". In accordance with line 21 of the definition the processor then resets the channel 70 by writing the value "Not Process p" into the channel 70 as shown in FIG. 15e. Lines 22 to 24 merely contain the explanation that the processor will now be prepared to carry out a block copy of data from one memory location (source) to another memory location (destination) while the T register 49 now contains the process descriptor of process Y and the A register contains the count of the number of bytes to be transmitted. Line 25 of the definition requires that the B register for process X is now loaded with the destination address which was previously is the C register. According to line 26 the PROC pointer register 45 is loaded with the WPTR of process Y which is derived by taking the process descriptor from register T and removing the priority bit. Line 27 requires that the C register for process X is loaded with the source address taken from the state location 67 of the workspace for process Y. Line 28 then requires the copy flag of the appropriate priority to be set to 1 so that at its next action the processor carries out the procedure "Block copy step" which has been defined above. This causes the processor to transfer one byte at a time from the source memory address to the destination memory address and it repeats this exercise progressively altering the source and destination addresses as each byte is transferred and progressively decreasing the count in the A register of the number of bytes remaining to be transferred. When the count is zero the descheduled process Y is rescheduled by the procedure run. This can be seen from the definition of block copy step. Line 2 defines the sequence that is to occur. The first step is line 3 which reads into the 0 register the byte from the source address in memory indicated by the C register. Line 4 then writes that byte of data from the 0 register into the destination memory address pointed to by the B register. Line 5 then clears the 0 register. Line 6 creates a new source pointer which is advanced by one byte and line 7 creates a new destination address which is advanced by one byte. Line 8 causes the count in the A register to be reduced by one. Line 9 then requires a test to be carried out to find whether in accordance with line 10 the A register now contains a zero count in which case the block copy has been completed. If the A register does not contain a zero count then the condition of line 21 is met. However, as the copy flag is still set to 1 the processor will continue to take an appropriate next action. If the priority of the process involved in the block copy is a low priority process and a high priority process has become ready to run then the processor may interrupt the block copy after transmitting one or a number of bytes prior to completion of the full message transfer in order to execute the higher priority process. However, assuming that there is no higher priority process awaiting then on reaching line 22 of the block copy step, the processor will repeat the sequence commencing from line 2 as the copy flag is still set. Consequently it will repeat the procedure of lines 3 to 8 of the block copy step until the count is zero. Line 13 then requires the copy flag to be cleared and reset to zero. Lines 14 and 15 require the processor to check whether the T register 49 has a value other than Not Process p. In the present case it will have the process descriptor of the descheduled process Y. Consequently the sequence beginning at line 16 will occur and the process descriptor register 46 will be loaded with the process descriptor of process Y which was previously contained in the T register. The previously described procedure run will then be effected in order to reschedule process Y. Lines 19 and 20 merely indicate that if the T register had not contained the process descriptor of a descheduled process then the action would have been skipped.

EXAMPLE 2

FIG. 16 shows in the sequence message communication between an outputting process Y on a first microcomputer 251 communicating with an inputting process X on a second microcomputer 252. The output pin 27 of an output channel 90 for process Y is connected by a single wire 253 to the input pin 26 of the input channel 91 for process X.

With all processes executing output or input using a hard channel the process is descheduled after executing the appropriate output or input instruction. The transfer of the required number of bytes from the source address in the memory of one microcomputer to the destination address in the memory of the other microcomputer is carried out under the control of the link units described in FIGS. 10, 11, 12, 13 and 14. The transfer of bytes is carried out independently of action by the processor so that the processor of both microcomputers can be executing current processes independently of the message transfer. When the links have reached a stage in the message transfer which require further action by the processor they make suitable requests to the processor. Each link channel has a channel address which consists of one addressable word in memory called the process word. The addresses of these hard channel process words are chosen so that the processor recognises them as hard channels needing separate connections to the links. In each of FIGS. 16, 17, 18 and 19 a similar format has been used for indicating the output channel 90 for process Y and the input channel 91 for process X. The channel has its associated process word 256 marked with the abbreviation PW. The output channel has registers 254 which have been described above in FIG. 12 and a location 257 in which the state of the transfer state machine 113 is indicated. For the input channel 91 the process word location 256 is shown as well as the input channel registers 255 which have already been described in FIG. 13 and a location 258 shows the states of the three state machines from FIG. 13. In FIG. 16 both processes have similar priority and the outputting process Y attempts to output a message before process X attempts to input a message. In accordance with lines 2 to 4 of the definition of "output message" process Y loads into the A register 54 the count of the number of bytes to be transmitted in the message, into the B register 55 the address of the channel to be used and into the C register 56 the source address in memory for the first byte to be copied. As is shown in FIG. 16a at this time the output channel is idle whereas the input channel has the states data absent, idle and disabled. After FIG. 16a process Y executes the operation "output message" and in accordance with line 6 of the definition of that operation the processor finds that the channel is a hard channel and consequently in accordance with line 7 the procedure "link channel output action" is carried out. The definition of that procedure "link channel output action" indicates that the current IPTR for process Y is taken from the IPTR 50 and stored in the IPTR location of the workspace for process Y. Line 5 requires that the process descriptor of process Y is written into the process word location 256 of the output channel 90. Line 6 sets the port number for the output channel and line 7 requires the procedure "cause link output" which has been described above. That transfers into the channel registers 254 the count source and priority from the appropriate registers in use in execution of the process Y. An input request is also made to the link channel so that the first byte of data is transmitted. According to line 8 the SNPFLAG is set to 1 so that the next action by the processor requires process Y to be descheduled as previously described. The position is as shown in FIG. 16b.

When process X is about to execute input message it loads the A register 54, B register 55 and C register 56 with the count channel and destination required for the input as shown in FIG. 16c. When process X executes the operation "input message", it finds in accordance with line 6 of the definition that the channel is a hard channel and consequently it performs the procedure "link channel input action". This carries out the same sequence as has been described for link channel output action. It stores the IPTR of X in the IPTR location 65 of the workspace of process X and writes the process descriptor for process X into the process word 256 of the input channel 91. It loads the count destination and priority of X into the registers 255 of the input channel 91. In this case line 7 of the procedure link channel input action makes an output request to the link so that an acknowledge packet is sent from the output channel associated with process X to the input channel associated with process Y. The position is as shown in FIG. 16b.

A plurality of data bytes in data packets are then sent each followed by an acknowledge packet as has already been described with reference to FIG. 14. When the final acknowledge packet has been sent from process X the link for process X makes a run request on line 84e as described with reference to 13 so that the processor of microcomputer 258 reschedules process X by adding it to the end of the list if there is already a list. This is the position shown in 16e. After 16e the final acknowledge packet is received by the input channel for process Y and a run request signal is generated on line 84b of FIG. 12 so that the processor when asked to take next action adds process Y to the end of the list of appropriate priority. The position is then as shown in FIG. 16f.

Process Input from Alternative Input Channels

An alternative process is one which selects one of a number of channels for input and then executes a corresponding component process of the alternative process. The selection of the channel from the alternatives available is performed by the inputting process examining all the channels to determine if one or more are ready for input in the sense that it has an outputting process already waiting to output through that channel. If no channel is found to be ready the inputting process is descheduled until one of the channels becomes ready. If at least one of the channels was found to be ready, or if the inputting process is rescheduled due to action by an outputting process, the process selects one of the inputs which is now ready and performs the input through that channel. During the selection of the input channel the state location 67 of the process workspace can take only the special values enabling p, waiting p, and ready p.

In order to allow an inputting process input from one of a number of alternative channels it is important that the inputting process can be descheduled if none of the alternative input channels are ready when the inputting process first reaches the stage in its program where it wishes to input from one of those alternatives. This is particularly important where the processor is operating with different priority processes. Otherwise a high priority process wishing to effect alternative input could hold up indefinitely low priority processes while it remains scheduled merely repeatedly testing the state of the various alternative input channels awaiting an output process on one of them. Consequently the present embodiment allows the inputting process to be descheduled if none of the alternative input channels are ready when they are first tested by the inputting process. If the inputting process has descheduled in this way a request may be made to the processor to reschedule the process as soon as one of the channels becomes ready due to action by an outputting process. However it may occur that more than one outputting channel becomes ready before the inputting process has been rescheduled and carried out its input. Consequently as soon as any output process makes a channel ready at a time when the inputting process is descheduled and waiting it is necessary to prevent more than one request being made to the processor to reschedule the inputting process. This is achieved by use of instructions incorporating the above defined operations alternative start, enable channel, alternative wait, disable channel, alternative end and input message. Any process wishing to effect an alternative input must first execute an alternative start followed by the operation enable channel once for each of the possible alternative channels. This is followed by alternative wait, disable channel and alternative end. After this the process will need to execute some load instructions in order to give count channel and source information for use in "input message" as previously described.

Various examples which involve the instructions for alternative input will now be described.

EXAMPLE 3

This relates to communication between an outputting process Y on one microcomputer passing message through a serial link to an inputting process X on a different microcomputer. Process X commences the input operations before Y executes any output instructions. None of the alternative inputs is ready at the time the process X commences. It further assumes that once one of the channels becomes ready due to output action by process Y none of the other alternative channels becomes ready. Initially process X executes "alternative start" and in accordance with the definition of that operation it writes "enabling p" into the state location 67 of the workspace of process X. The state machines of the output channel 90 and input channel 91 are as shown in FIG. 17a. Process X then executes the operation "enable channel". It does this for each of the possible input channels but FIG. 17b shows the result of this operation on the particular channel which will be used by process Y. As is shown in the definition of enable channel, process X initially loads a guard value into the A register and this is checked before proceeding with the operation. Lines 8 to 17 specify the sequence to be followed if the channel is a soft channel. In the present case the address of the channel corresponds to that of a hard channel and consequently the sequence from lines 21 to 29 are followed. Line 21 calculates the port number of the channel and line 22 causes the processor to make a status enquiry for that channel. Lines 23 to 25 indicate that if the channel had been ready, the value ready p would have been written into the state location 67 for the process X. However that is not the case and consequently the sequence from lines 27 to 29 apply. The process descriptor for process X is written into the process word location for the channel in accordance with line 28 of the definition and line 29 requires the procedure enable link which has been defined above. This sets the priority flag of the input channel to the priority of the process X and causes an enable request to the link channel. This causes the state of the channel to be changed to "enabled" as shown in FIG. 17b. Process X then executes an alternative wait. In accordance with line 2 of the definition of alternative wait this sets the value −1 into the zero location of the workspace for process X. Lines 3 and 4 check the content of the state location 67 to see if it is ready p. As it is not, the sequence of lines 8 to 11 are carried out. In other words the value waiting p is written into the state locations 67 for process X. The IPTR for process X is stored in the IPTR location 65 and process X is descheduled as a result of setting the SNPFLAG to 1. This is shown in FIG. 17c. After this process Y begins an output operation by effecting output message. In the usual way and as has been described above, this will cause process Y to be descheduled and the output link will send the first data byte. The arrival of that byte will cause the input link for process X to make a ready request to the processor for process X. This is the position shown in FIG. 17d. Process X then becomes rescheduled and carries out the operation "disable channel" which selects one channel and disables the rest. As can be seen from line 1 of the definition of disable channel, the A register is loaded with an instruction offset which is necessary to derive the address of the next instruction to be executed by the inputting process after the operation ALTEND. The B register has a guard value and the C register is loaded with the channel address. It will be understood that this instruction is repeated for each of the possible alternative input channels. Lines 9 and 10 deal with checking the guard values. Providing this test is satisfactory the processor tests according to lines 13 and 14 whether the channel address is that of a soft channel. However in the present case line 26 applies in that the address of the channel is that of a hard channel. Line 29 calculates the port number of the channel and line 32 causes a status enquiry to be made to the link by the processor. If the channel is found to be ready in accordance with line 34 the above defined procedure "is this selected process" is carried out. According to line 4 of that definition this loads into the 0 register the contents of the zero location of the workspace of process X. According to lines 5 and 6 this is tested to see if it is $-1$ and if so the contents of the A register are written to the memory location indicated by the WPTR REG and the A register has the value machine TRUE indicating that this is the selected process. In accordance with line 10 if the 0 register had not contained the value $-1$ then this would not be the selected process. FIG. 17e shows the state of the two processes immediately before executing disable channel and FIG. 17f shows the position after executing disable channel. After FIG. 17f process X executes the operation ALTEND which from line 1 of its definition loads the 0 register with the contents of the memory address indicated by the pointer in the WPTR register. It then puts a pointer into the IPTR register which has the previous value of the IPTR register together with the offset contained in the 0 register. This enables the process to continue at the desired position in its instruction sequence. After executing ALTEND, process X may load the appropriate values for the message transmission and execute input message which will carry out the sequence illustrated in FIG. 16 from FIG. 16c onwards.

Although the above example related to use of alternative hard channels, the sequence is generally similar where a process carries out an alternative input through one of a number of alternative soft channels. Initially execution of "alternative start" loads the special value "enabling p" to the state location of the process in order to indicate that the process is carrying out an alternative input. The operation "enable channel" is then carried out on each channel in order to test the state of the channel. Lines 12, 14 and 16 of the definition of "enable channel" check the contents of the channel. In accordance with line 12, if no workspace pointer is found in the channel the value "Not Process p" is written into the channel. In accordance with line 17, if the workspace pointer of the outputting process is found in the channel the value "Ready p" is written into the state location of the inputting process. This is done for each channel in order to check whether any is already "ready" as a result of an instruction executed by an outputting process and for any channels which are not found to be ready the workspace pointer of the inputting process is left in the channel. The inputting process then executes "alternative wait" which effects the inputting process rather than the channel. In accordance with line 2 of the definition it loads the value $-1$ into the zero location of the workspace for the inputting process and lines 5 and 7 of the definition of "alternative wait" check on the contents of the state location of the inputting process. If it finds value "Ready p" then the inputting process is not descheduled but if it does not find "Ready p" then according to line 9 of the definition it writes "waiting p" into the state location of the process and lines 10 and 11 of the definition lead to descheduling of the inputting process. If the inputting process was not descheduled then it will carry on with its next instruction which will be "disable channel". If on the other hand it had been descheduled it will in due course be rescheduled as a result of an outputting process attempting to use one of the alternative channels and when the inputting process is rescheduled it will resume with its next instruction which will be "disable channel". It will carry out this operation for each of the alternative channels and prior to each operation the A register will be loaded with an offset number to indicate the instruction offset necessary to locate the next instruction in the program sequence for that process should that channel be chosen for the input. Lines 18, 20 and 24 indicate respective tests on whether or not the channel contains the value "Not Process p", a pointer to the inputting process, or a pointer to an outputting process. If in accordance with line 24 it is found that the channel contains a pointer to an outputting process line 25 requires the procedure "is this selected process". According to the definition of this procedure, the zero location of the workspace of the process is checked to see that it still has the value $-1$ and provided it does this then becomes the selected channel for the input and the procedure removes the value $-1$ and writes into the zero location of the workspace the instruction offset necessary. When further "disable channels" operations are carried out on the remaining channels some may be found to be "ready" by holding a pointer to an outputting process but when the procedure "is this selected process" is carried out it will no longer locate the value $-1$ in the zero location of the workspace of the inputting process and consequently it will be apparent that a channel has already been selected and consequently no further channel is to be selected. Any channels which are still found to contain a pointer to the inputting process will meet the condition of line 20 of the "disable channel" definition and this will lead to the sequence following line 22 in which the channel is changed back to "Process p". After the "disable channel" operation has been carried out on all the alternative channels, the inputting process carries out the operation "alternative end" which transfers the instruction offset from the zero location of the workspace of the inputting process and causes the offset to be added to the instruction pointer for the process so that the continuing program for that process is picked up at the correct point in its instruction sequence.

EXAMPLE 4

This example illustrated in FIG. 18 has process Y performing an output operation on one microcomputer in order to communicate with process X on another microcomputer which performs alternative input operations on a number of channels of which the one used by process Y is the only input channel which is ready. Initially process Y executes output message in accordance with the sequence described for FIGS. 16a and 16b. This is the position which has been reached in FIG. 18a. Process X then executes an alternative start operation and is about to execute enable channel and the position is shown in FIG. 18b. After executing enable channel the position moves to that illustrated in FIG. 18c. Process X then executes alternative wait but continues and is not descheduled and the position as process X is about to execute disable channel is shown in FIG. 18d. Having executed disable channel, the processes continue as previously described with reference to FIG. 17 after execution of disable channel.

EXAMPLE 5

FIG. 19 illustrates two processes X and Y of the same priority on the same microcomputer in the situation where process X carries out an alternative input operation prior to output process Y commencing an output operation. The sequence will be the same if process Y was at a higher priority than X. Initially process X executes alternative start and this is the position shown in FIG. 19a. It merely writes "enabling p" into the state location of the workspace for process X. Process X then executes enable channel and this moves on to the position shown in FIG. 19b in which the process descriptor of process X is located in the channel. In order to move to FIG. 19c process X executes an alternative wait operation and as the state location of process X contains enabling p the location is updated to waiting p and process X is descheduled. When process Y wishes to output it commences as shown in FIG. 19d by loading its registers and executes output message. It finds that the channel contains the process descriptor of the waiting process X and process Y reads the state location 67 of the workspace for process X and finds that it contains the value waiting p. This indicates that process X is involved in an alternative input operation. This causes the state location of X to be set to ready p, the channel is loaded with the process descriptor of process Y. The workspace of process Y is used to save the IPTR value for Y and the source address. Process Y sets the SNPFLAG to 1 and schedules process X. This is the position shown in FIG. 19e. As the SNPFLAG is set to 1, process Y is descheduled. Process X now that it is scheduled is about to execute disable channel operation as shown in FIG. 19f. After executing the disable operation the position is as indicated in FIG. 19g. After that process X executes the operation alternative end which is followed by further load instructions and input message as previously described.

EXAMPLE 6

Figure 20A:
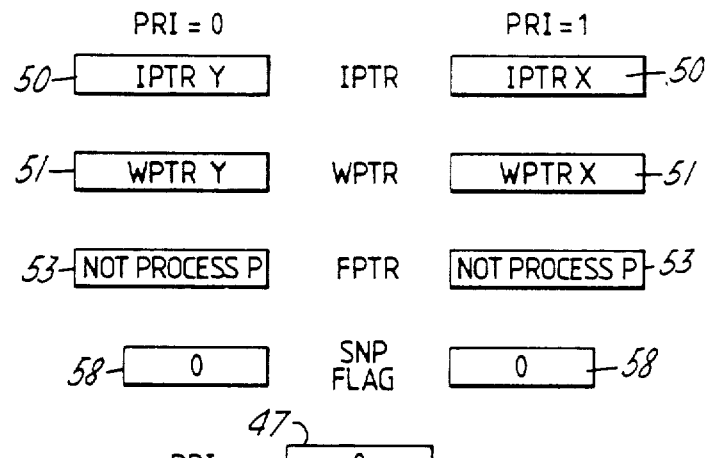
FIG. 20 illustrates a sequence 20(a) to 20(c) showing relevant register contents when a low priority process X is interrupted by a high priority process Y involved in an output operation through a serial link.
Figure 20B:
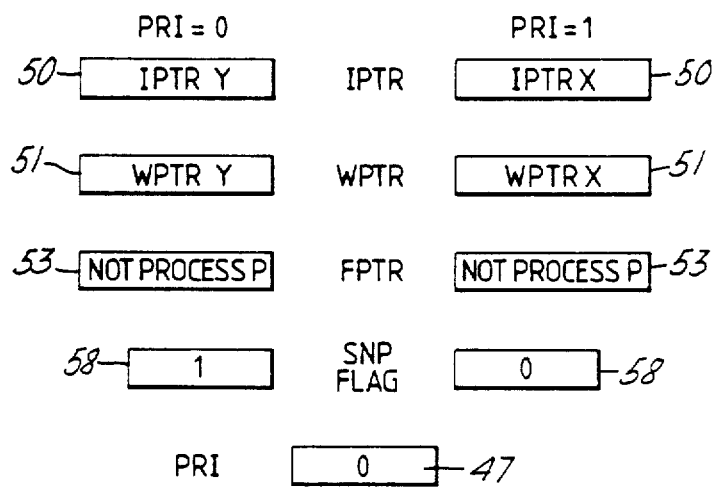
Figure 20C:
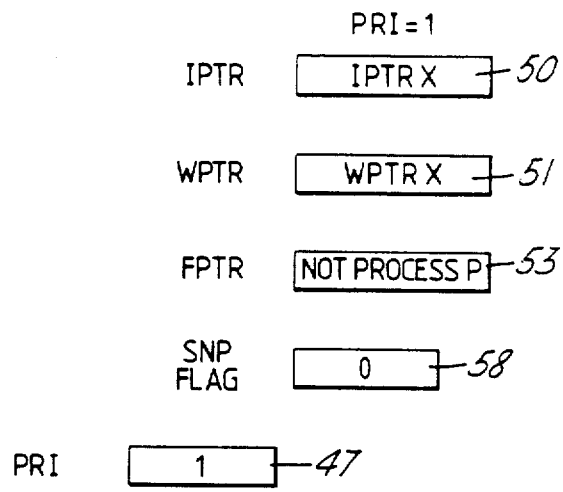

The example shown in FIGS. 20a, 20b and 20c illustrate how a high priority process Y which is executed by the same microcomputer as a lower priority process X can cause interruption of process X. Process X is a low priority 1 process which during the course of its execution created process Y. As process Y has priority 0 which is the high priority process X was interrupted leaving its WPTR in the priority 1 WPTR REG 51. At the position shown in FIG. 20a process Y is the current process with the priority flag 47 set to indicate a priority 0 process and in the example shown no processes are waiting on a list for either priority 1 or priority 0. During execution of process Y it may wish to perform an output message using a link. This will cause wetting of the SNPFLAG to 1 as shown in FIG. 20b and process Y will be descheduled. The start next process procedure will clear the SNPFLAG 58 and the processor will test the FPTR (0) to determine if there was another process on the priority 0 list. As there is not (because the FPTR REG (0) contains the value Not Process p) the processor will set the PRIFLAG 47 to 1 and as the WPTR REG (1) contains a valid workspace pointer for the process X the procedure start next process performs no further action. The processor as its next action checks that there are no requests from links and the SNPFLAG (1) is not set and consequently it restarts execution of process X. This is the position in FIG. 20c. At some later stage the link through which process Y was outputting a message will have received the final acknowledge at the end of the succession of bytes which were incorporated in the message. At that time the link used by process Y will make a run request to the processor. On completion of the current action the processor will decide what action next to perform. The SNPFLAG (1) is not set and there is a run request for a channel priority 0 which is higher than that of priority X which is the current process. The processor therefore performs the procedure "handle run request" which copies the process descriptor of the waiting process Y into the PROCDESC REG and performs the run procedure. The run procedure loads the process workspace pointer of process Y into the PROCPTR REG and the priority of Y into the PROCPRIFLAG. As the priority of Y is higher than that of the priority indicated in the PRIFLAG of the current X process an interrupt occurs. The PRIFLAG is set to 0 and the WPTR REG (0) is set to the process workspace of Y and the IPTR REG (0) is loaded. The position has now returned to that shown in FIG. 20a The next action of the processor will be to execute the next instruction process Y which is the instruction following the output message instruction.

EXAMPLE 7

Figure 21A:
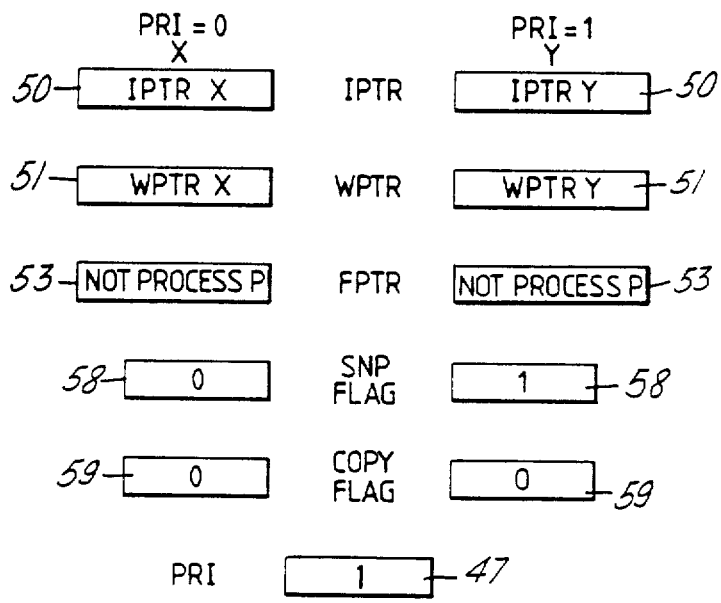
FIG. 21 illustrates in a sequence 21(a) to 21(c) the contents of relevant registers during communication between a high priority process X effecting "alternative input" and a low priority process "Y" effecting an output operation on the same microcomputer.
Figure 21B:
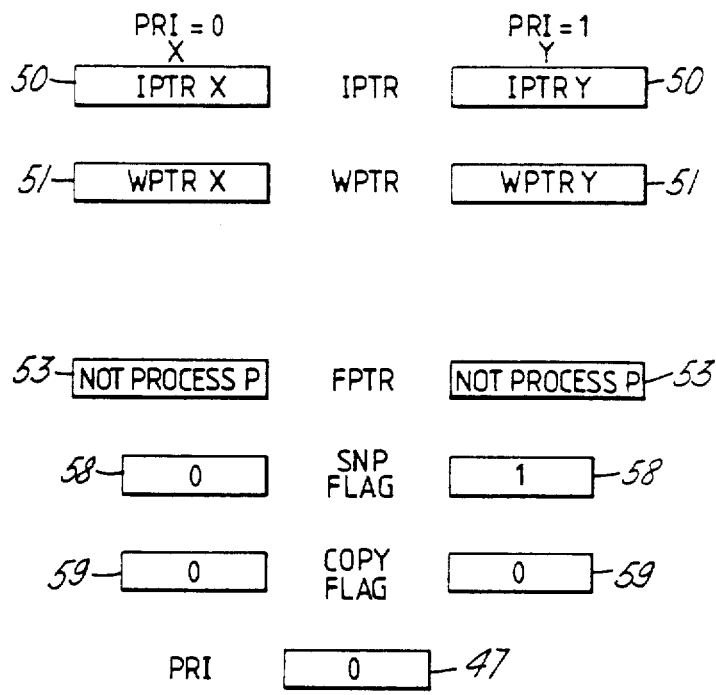
Figure 21C:
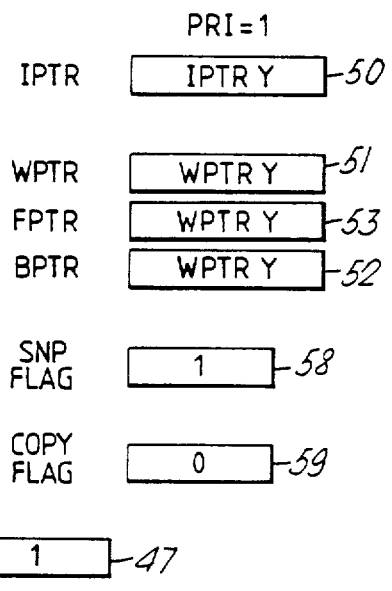

FIGS. 21a, 21b and 21c illustrate the register and flag changes during a message passing between an output process Y and a higher priority process X which is carrying out an alternative input. In this particular example process X has already commenced an alternative input and has executed alternative wait so that process X is descheduled with its process descriptor in the channel. When process Y executes output message, it finds the process descriptor of X in the channel and therefore reads the state location of the workspace of process X where it finds the value waiting p thereby indicating that process X is performing an alternative input. Process Y therefore causes its process descriptor to be located in the channel and the IPTR of Y is written into the IPTR location of the workspace of Y and the source of the first byte of the message is written into the state location of the workspace of Y. The SNPFLAG (1) is then set to 1 as shown in FIG. 21a. This will later cause process Y to be descheduled. The process descriptor of X will be written into the PROCDESC register and the processor will carry out a run procedure for process X. However, as the processor is now scheduling process X which is of priority 0 and the processor is currently at priority 1 it will cause an interrupt of priority 1 and starts to execute process X before starting the procedure Start Next Process. The state after completion of the run procedure is shown in FIG. 21b. Process X then performs the disable channel operations and selects the channel which is used by process Y. Process X then continues to execute an input message instruction which resets the channel to the value "Not Process p", loads the TREG with the process descriptor of process Y and sets the copy flag to 1. The processor then will cause the message to be copied and finally process Y to be scheduled. The run procedure will cause the process Y to be placed on the priority 1 queue. Eventually process X will deschedule by setting the SNPFLAG (0). The processor then decides what action to perform next and since the SNPFLAG (0) is set it will execute start next process and this will cause the machine to return to priority 1 and this is the state shown in FIG. 21c. As the SNPFLAG (1) is still set the processor will execute the procedure start next process which will deschedule process Y. However process Y is still on the priority 1 list and will eventually be scheduled.

Instruction Sequence for Example Programs

In our European patent specification No. 0110642 there are described two example processes one dealing with the variable "rotations" and the other with variable "miles" and the instruction sequences to carry out two example programs for those processes has been given. The same two examples are set out below. Both programs are the same as were set out in European patent specification No. 0110642 and are again written using OCCAM language. Below each of the example programs is the instruction sequence formed by use of a compiler to convert the OCCAM statements into the machine instructions. In this case the machine instructions are in accordance with the functions and operations defined above.

Line numbers have been added to the program and instruction sequence for each example and the line numbers are for reference purposes only.

Example 1

| | | | |
|---|---|---|---|
| 1. | | VAR rotations : | |
| 2. | | WHILE TRUE | |
| 3. | | SEQ | |
| 4. | | rotations := 0 | |
| 5. | | WHILE rotations < 1000 | |
| 6. | | SEQ | |
| 7. | | rotation ? ANY | |
| 8. | | rotations := rotations + 1 | |
| 9. | | mile ! ANY | |

| | | Instruction Sequence | | Program in OCCAM language |
|---|---|---|---|---|
| | | Function code | Data | |
| | | | | VAR rotations: |
| | | | | WHILE TRUE |
| | | | | SEQ |
| 1. | L1: | | | |
| 2. | | ldc | 0 | 7 | 0 | rotations := 0 |
| 3. | | stl | 0 | 1 | 0 | |
| 4. | L2: | | | | WHILE rotations < 1000 |
| 5. | | | | | |
| 6. | | pfix | 3 | 14 | 3 | |
| 7. | | pfix | 14 | 14 | 14 | SEQ |
| 8. | | ldc | 1000 | 7 | 8 | |
| 9. | | ldl | 0 | 0 | 0 | |
| 10. | | opr | gt | 13 | 13 | |
| 11. | | cj | L3 | 10 | 11 | |
| 12. | | ldlp | 3 | 2 | 3 | rotation ? ANY |
| 13. | | ldl | 1 | 0 | 1 | |
| 14. | | ldc | 1 | 7 | 1 | |
| 15. | | opr | bcnt | 13 | 7 | |
| 16. | | pfix | 1 | 14 | 1 | |
| 17. | | opr | in | 13 | 6 | |
| 18. | | ldl | 0 | 0 | 0 | rotations := |
| 19. | | adc | 1 | 8 | 1 | rotations + 1 |
| 20. | | stl | 0 | 1 | 0 | |
| 21. | | nfix | 1 | 15 | 1 | |
| 22. | | j | L2 | 9 | 15 | |
| 23. | L3: | | | | |
| 24. | | ldlp | 3 | 2 | 3 | mile ! ANY |
| 25. | | ldl | 2 | 0 | 2 | |
| 26. | | ldc | 1 | 7 | 1 | |
| 27. | | opr | bcnt | 13 | 7 | |
| 28. | | pfix | 1 | 14 | 1 | |
| 29. | | opr | out | 13 | 7 | |
| 30. | | nfix | 1 | 15 | 1 | |
| 31. | | j | L1 | 9 | 5 | |

Example 2

| | | | |
|---|---|---|---|
| 1. | | VAR miles : | |
| 2. | | SEQ | |
| 3. | | miles := 0 | |
| 4. | | WHILE TRUE | |
| 5. | | ALT | |
| 6. | | mile ? ANY | |
| 7. | | miles := miles + 1 | |
| 8. | | fuel ? ANY | |
| 9. | | SEQ | |
| 10. | | consumption ! miles | |
| 11. | | miles := 0 | |

| | | Instruction Sequence | | Program in OCCAM language |
|---|---|---|---|---|
| | | Function code | Data | |
| | | | | VAR miles : |
| | | | | SEQ |
| 1. | | ldc | 0 | 7 | 1 | miles := 0 |
| 2. | | stl | 1 | 1 | 1 | WHILE TRUE |
| 3. | L1 | | | | |
| 4. | | pfix | 1 | 14 | 1 | |
| 5. | | opr | alt | 13 | 8 | ALT |
| 6. | | ldl | 3 | 0 | 3 | |
| 7. | | ldc | 1 | 7 | 1 | |
| 8. | | pfix | 1 | 14 | 1 | |
| 9. | | opr | enbc | 13 | 13 | |
| 10. | | ldl | 4 | 0 | 4 | |
| 11. | | ldc | 1 | 7 | 1 | |
| 12. | | pfix | 1 | 14 | 1 | |
| 13. | | opr | enbc | 13 | 13 | |
| 14. | | pfix | 1 | 14 | 1 | |
| 15. | | opr | altwt | 13 | 9 | |
| 16. | | ldl | 3 | 0 | 3 | |
| 17. | | ldc | 1 | 7 | 1 | |
| 18. | | ldc | (L2-L2) | 7 | 0 | |
| 19. | | pfix | 1 | 14 | 1 | |
| 20. | | opr | disc | 13 | 14 | |
| 21. | | ldl | 4 | 0 | 4 | |
| 22. | | ldc | 1 | 7 | 1 | |
| 23. | | ldc | (L3-L2) | 10 | | |
| 24. | | pfix | 1 | 14 | 1 | |
| 25. | | opr | disc | 13 | 14 | |
| 26. | | pfix | 1 | 14 | 1 | |
| 27. | | opr | altend | 10 | | |
| | | | 13 | | |
| 28. | L2: | | | | |
| 29. | | ldlp | 2 | 2 | 2 | miles ? ANY |
| 30. | | ldl | 3 | 0 | 3 | |
| 31. | | ldc | 1 | 7 | 1 | |
| 32. | | opr | bcnt | 13 | 7 | |
| 33. | | pfix | 1 | 14 | 1 | |
| 34. | | opr | in | 13 | 6 | |
| 35. | | ldl | 1 | 0 | 1 | |
| 36. | | adc | 1 | 8 | 1 | miles := miles + 1 |
| 37. | | stl | 1 | 1 | 1 | |
| 38. | | j | L4 | 9 | 12 | |
| 39. | L3: | | | | |

-continued

| | | | | | |
|---|---|---|---|---|---|
| 40. | ldlp | 2 | 2 | 2 | fuel ? ANY |
| 41. | ldl | 4 | 0 | 4 | SEQ |
| 42. | ldc | 1 | 7 | 1 | |
| 43. | opr | bcnt | 13 | 7 | |
| 44. | pfix | 1 | 14 | 1 | |
| 45. | opr | in | 13 | 6 | |
| 46. | ldlp | 1 | 2 | 1 | consumption ! miles |
| 47. | ldl | 5 | 0 | 5 | |
| 48. | opr | bcnt | 13 | 7 | |
| 49. | pfix | 1 | 14 | 1 | |
| 50. | opr | out | 13 | 7 | |
| 51. | ldc | 0 | 7 | 0 | miles := 0 |
| 52. | stl | 1 | 1 | 1 | |
| 53. L4: | | | | | |
| 54. | nfix | 3 | 15 | 3 | |
| 55. | j | L1 | 9 | 15 | |

It will be seen that these two programs now produce different instruction sequences from those referred to in European patent specification No. 0110642 as they use functions and operations as set out above.

Example 1

It can be seen that line 7 of the program requires an input from a channel "rotation" and this causes line 12 of the corresponding instruction sequence to load the destination address for the data to be input. Line 13 loads a pointer to the channel to be used. Line 14 loads a count of the number of words to be input. Line 15 converts the count from words to bytes. Lines 16 and 17 load the operation "input message" by use of the pfix function. Similarly line 9 of the program requires an output through a channel and in the corresponding instruction sequence line 24 loads a pointer to the source of data to be output. Line 25 loads a pointer to the channel to be used. Line 26 loads the count of the output message in words. Line 27 converts this count to bytes. Again line 28 and 29 use a pfix instruction in order to carry out the "output message" instruction.

Example 2

This example includes an alternative inputting operation which commences at line 5 of the program. This requires an alternative input either from the channel "mile" in accordance with line 6 of the program or from channel "fuel" in accordance with line 8 of the program. In the corresponding instruction sequence it can be seen that the alternative input operation begins at line 5. Line 5 requires the operation "alternative start". Line 6 loads a pointer to the channel "mile". Line 7 loads a guard value "true". Lines 8 and 9 use as pfix function in order to operate "enable channel" for the channel "mile". Line 10 loads a pointer to the channel "fuel" and line 11 loads a guard value "true". Lines 12 and 13 use the pfix function in order to carry out the operation "enable channel" for the channel "fuel". Lines 14 and 15 use a pfix function in order to operate "alternative wait" for this process. Line 16 loads a pointer to the channel "mile" and line 17 loads a guard value "true". Line 18 loads the instruction offset which will be necessary if the process inputs through the channel "mile". In this case the offset required is 0. Lines 19 and 20 use the pfix function to carry out the operation "disable channel" on the channel "mile". Line 21 loads a pointer to the channel "fuel" and line 22 loads a guard value "true". Line 23 loads the instruction offset which will be necessary if the process inputs through the channel "fuel". Lines 24 and 25 use the pfix function in order to operate "disable channel" on the channel "fuel". Lines 26 and 27 use the pfix function in order to operate "alternative end".

The alternative end operation will load the appropriate instruction offset depending on the channel through which input has been effected so that the process then proceeds to carry out the instruction sequence between the reference markers L2 to L3 if the channel "mile" was used for the input. Alternatively the instruction offset will cause the process to carry out the instruction sequence between the reference points L3 to L4 if the channel "fuel" was selected.

NETWORKS OF VARIABLE WORDLENGTH

As has been described above, the message transmission between processes on the same microcomputer or different microcomputers takes place in any number of data packets of standard length. Consequently any message length can be chosen. As each packet contains a byte of data communication can occur between microcomputers of different wordlengths and it is merely necessary to supply the appropriate number of bytes in each message to make up a complete number of words for the microcomputer involved in the message transmission. Such a network is illustrated in FIG. 22 in which a plurality of microcomputers having wordlengths of 16 bits, 24 bits or 32 bits are shown. Each microcomputer is generally as described above.

Microcomputer 260 has registers of 16 bit wordlength whereas microcomputers 261 and 262 have registers of 24 bit wordlength. Microcomputer 263 has registers of 32 bit wordlength. The above described message transmission instructions will operate in the same way regardless of the wordlength of the microcomputer involved in the network.

The invention is not limited to the details of the foregoing examples.

We claim:

1. A method of operating concurrent processes in a computer system wherein each concurrent process executes a program having plurality of instructions comprising the steps of:
   (a) forming a respective first pointer for each concurrent process to identify the process,
   (b) forming a respective second pointer for each concurrent process to indicate a program stage for the process,
   (c) scheduling a plurality of the concurrent processes for execution by a processor, including
      (i) indicating a process which is being executed by the processor, said process being referred to as the current process,
      (ii) identifying one or more processes forming a collection awaiting execution by the processor,
      (iii) in response to a particular instruction stopping execution of the current process, storing a second pointer for said current process, changing the indication of the current process to indicate the next process in said collection and then executing said next process at a program stage indicated by the second pointer of the said next process; and
   (d) transmitting messages between concurrent processes so that data is transferred from an outputting process to an inputting process in a communicating pair of processes, each process in said air executing a sequence of instructions in a program including communication instructions, said scheduling step being responsive to said communication instructions so that message transmission between the pair of processes is completed when both are at corresponding program stages, the transfer of data being effected by (i) transferring from one addressable location to another at least one message unit of predetermined bit length, (ii) execution of at least one of the processes of each pair providing a count of the number of message units to be transferred in a message, (iii) execution of the outputting process providing an indication of a source address from which data is to be output, (iv) execution of the inputting process providing a destination address to which the data is to be input and (v) transferring from the source address to the destination address the number of message units indicated by said count.

2. The method according to claim 1 wherein said concurrent processes are distributed in a computer system comprising a network of interconnected integrated circuit devices and said step of transmitting messages between concurrent processes further includes addressing communication channels of a first type to permit said data transfer to occur between processes on the same integrated circuit device and addressing channels of a second type to permit said data transfer to occur between two processes, one of which is on one integrated circuit device and the other of which is on a different integrated circuit device.

3. The method according to claim 1 further comprising establishing within said memory a respective workspace for each process, each workspace comprising a plurality of addressable memory locations, and recording in said locations of each workspace variables associated with the corresponding process, and wherein said identifying step in said scheduling step includes forming a linked list of said processes awaiting execution by providing in said workspace of each process on said linked list an indication of the first pointer for the respective next process scheduled for execution by the processor.

4. The method of operating concurrent processes according to claim 1 wherein the transfer of each message unit comprises transferring eight bits.

5. The method of operating concurrent processes according to claim 1 further including counting the number of message units transferred in a message and providing a signal when all message units in the message have been transferred.

6. A method according to claim 1 further including counting the number of message units transferred in a message and changing the indication of source address as the number of message units remaining to be transferred decreases.

7. The method according to claim 1 further comprising counting the number of message units transferred in a message and changing the indication of said destination address as the count of the number of message units remaining to be transferred decreases.

8. A microcomputer comprising memory and a processor coupled thereto and being operable to execute a plurality of concurrent processes in accordance with a plurality of program steps, said program steps comprising a plurality of instructions for sequential execution by the processor, each instruction including a set of function bits which designate a function to be executed by the processor wherein:

(a) the microcomputer includes a scheduling means comprising (i) means for indicating the process which is being executed by the processor, said process being called the current process, (ii) means for identifying one or more processes which form a collection awaiting execution by the processor, and (iii) next process indicator means to indicate the next process in the collection to be executed by the processor, (b) said processor includes means responsive to a selected one of said instructions to stop execution of said current process by said processor and to respond to said next process indicator means to make the next process in the said collection the current process, whereby the processor is operated to share its processing time among said plurality of concurrent processes; and (c) said microcomputer includes message transmission means for effecting synchronized data transfer between two of said concurrent processes, said message transmission means comprising a plurality of communication channels, a status indicator to indicate the status of data communication through each channel and synchronizing means cooperating with said scheduling means to respond to said status indicator to interrupt a current process or add an interrupted process to said collection so that communication between two communicating processes is completed when the two processes are at corresponding program steps, said message transmission means further comprising (i) means for transferring from one addressable location to another a message unit of predetermined bit length, (ii) means responsive to execution of a message instruction to provide a count of the number of message units to be included in a message, (iii) source addressing means responsive to execution of a message instruction by an outputting process to indicate the address from which data is to be output and (iv) destination addressing means responsive to execution of a message instruction by an inputting process to indicate the address to which the data is to be input.

9. The microcomputer according to claim 8 wherein said means for identifying processes comprises a linked list indicating processes awaiting executing by said processor and means for indicating the last process on said linked list.

10. A microcomputer according to claim 9 wherein said memory provides for each process a respective workspace having a plurality of addressable locations, each of said workspaces including:

(i) memory locations for recording variables associated with a corresponding process, (ii) a program stage indicator for the corresponding process and (iii) a portion of said linked list when the corresponding process itself is on said linked list, said linked list portion indicating the next process on said linked list.

11. The microcomputer of claim 8 wherein said message transmission means permits data transfer between processes executed on the same microcomputer, at least one of said communication channels comprising a memory location.

12. A microcomputer according to claim 11 in which the processor further includes means for copying directly a number of bytes of data indicated as a result of execution of a message instruction, directly from one byte address to another in the memory of the microcomputer.

13. A microcomputer according to claim 8, wherein the message transmission means is arranged to permit external data transmission between processes which are executed on different microcomputers and the or each channel comprises an external communication link.

14. A microcomputer according to claim 13, wherein each external communication link comprises store means for holding one byte of data.

15. A microcomputer according to claim 14, wherein each external communication link is arranged to transmit a succession of bytes without action by the processor.

16. A microcomputer according to claim 15, wherein each external communication link is arranged to deschedule a process which executes a message instruction using the address of that link and each link includes means for storing an indication of the number of bytes to be transmitted through the link together with a pointer to the source or destination address for the next byte of the message.

17. A microcomputer according to claim 16, in which each external communication link includes means for counting the number of bytes transmitted and providing an indication when all bytes have been transmitted.

18. A microcomputer according to claim 16, wherein each external communication link includes signal generating means to generate a request signal to the processor to reschedule the process involved in the message transmission when all bytes of the message have been transmitted.

19. A network of directly interconnected micro-computers each comprising a single integrated circuit microcomputer, each said microcomputer comprising memory and a processor coupled to said memory and being operable to execute a plurality of concurrent processes in accordance with a plurality of program steps, said program steps comprising a plurality of instructions for sequential execution by the processor, wherein:
 (a) each said microcomputer includes a scheduling means comprising
  (i) means for indicating the process which is being executed on said microcomputer, said process being called the current process,
  (ii) means for identifying one or more processes which form a collection awaiting execution by the processor, and
  (iii) next process indicator means to indicate the next process in the collection to be executed by the processor,
 (b) each said processor including means responsive to a selected one of said instructions to stop execution of said current process by said processor and to respond to said next process indicator means to make the next process in the said collection the current process whereby each processor is operated to share its processing time among said plurality of concurrent processes, and
 (c) each said microcomputer including message transmission means for effecting synchronized data transfer between two of said concurrent processes, said message transmission means comprising a plurality of communication channels, a status indicator to indicate the status of data communication through each channel and synchronizing means cooperating with said scheduling means to respond to said status indicator to interrupt a current process or add an interrupted process to said collection so that communication between two communicating processes is completed when the two processes are at corresponding program steps, said message transmission means further comprising
  (i) means for transferring from one addressable location to another a message unit of predetermined bit length,
  (ii) means responsive to execution of a message instruction to provide a count of the number of message units to be included in a message,
  (iii) source addressing means responsive to execution of a message instruction by an outputting process to indicate the address from which data is to be output and
  (iv) destination addressing means responsive to execution of a message instruction by an inputting process to indicate the address to which the data is to be input.

20. A network according to claim 19 wherein each said means for identifying processes comprises a respective linked list indicating processes awaiting execution by said processor and means for indicating the last process on said linked list, and wherein said memory provides for each process on the microcomputer a respective workspace having a plurality of addressable locations, each of said workspaces including:
 (i) memory locations for recording variables associated with a corresponding process,
 (ii) a program stage indicator for the corresponding process and
 (iii) a portion of said linked list when the corresponding process is on said linked list, said linked list portion indicating the next process on said linked list.

* * * * *

UNITED STATES PATENT AND TRADEMARK OFFICE
CERTIFICATE OF CORRECTION

PATENT NO. : 4,783,734

DATED : November 8, 1988

INVENTOR(S) : Michael D. May; Roger M. Shepard, both of Bristol, U.K.

It is certified that error appears in the above-identified patent and that said Letters Patent is hereby corrected as shown below:

Claim 1, line 66, change "air" to -- pair --.

Signed and Sealed this

Fourth Day of April, 1989

Attest:

Attesting Officer

DONALD J. QUIGG

Commissioner of Patents and Trademarks